United States Patent
Page et al.

(10) Patent No.: US 10,812,772 B2
(45) Date of Patent: Oct. 20, 2020

(54) THREE-DIMENSIONAL SCANNING DEVICE AND METHODS

(71) Applicant: MODit 3D, Inc., San Rafael, CA (US)

(72) Inventors: James S. Page, San Rafael, CA (US); Rudy Lucas Samuels, San Rafael, CA (US)

(73) Assignee: MODit 3D, Inc., Berkeley, CA (US)

( * ) Notice: Subject to any disclaimer, the term of this patent is extended or adjusted under 35 U.S.C. 154(b) by 0 days.

(21) Appl. No.: 15/887,365

(22) Filed: Feb. 2, 2018

(65) Prior Publication Data

US 2018/0227570 A1  Aug. 9, 2018

Related U.S. Application Data

(60) Provisional application No. 62/454,660, filed on Feb. 3, 2017.

(51) Int. Cl.
| | |
|---|---|
| *H04N 13/122* | (2018.01) |
| *H04N 13/324* | (2018.01) |
| *H04N 5/232* | (2006.01) |
| *H04N 13/254* | (2018.01) |
| *G01B 11/25* | (2006.01) |

(52) U.S. Cl.
CPC ....... *H04N 13/122* (2018.05); *G01B 11/2513* (2013.01); *H04N 5/23245* (2013.01); *H04N 13/254* (2018.05); *H04N 13/324* (2018.05)

(58) Field of Classification Search
CPC ............... H04N 13/122; H04N 13/324; H04N 5/23245; H04N 13/254; G01B 11/2513
See application file for complete search history.

(56) References Cited

U.S. PATENT DOCUMENTS

| | | |
|---|---|---|
| 2002/0050988 A1 | 5/2002 | Petrov et al. |
| 2003/0025788 A1 | 2/2003 | Beardsley |
| 2007/0238981 A1* | 10/2007 | Zhu ........................ A61B 90/36 600/424 |
| 2013/0293684 A1* | 11/2013 | Becker ................. G01B 11/245 348/47 |
| 2014/0078260 A1 | 3/2014 | Taubin et al. |
| 2014/0172377 A1 | 6/2014 | Taubin et al. |
| 2015/0120260 A1 | 4/2015 | Taubin |

(Continued)

FOREIGN PATENT DOCUMENTS

| | | |
|---|---|---|
| WO | 2004/083778 A1 | 9/2004 |
| WO | 2015134961 A1 | 9/2015 |

OTHER PUBLICATIONS

Moreno et al, "Embedded Phase Shifting: Robust Phase Shifting With Embedded Signals", 2015, pp. 2301-2309, Publisher: Computer Vision Foundation, Published in: USA.

(Continued)

*Primary Examiner* — James M Pontius

(74) *Attorney, Agent, or Firm* — Loginov & Associates, PLLC; William A. Loginov

(57) ABSTRACT

A handheld data acquisition system for capturing three dimensional object shape data comprising a user feedback screen and a scanner module configured such that the scanner module may be rotated with respect to the feedback screen and the user may be able to scan objects including hard-to-reach areas while still being able to view feedback about the on-going scanning process.

10 Claims, 19 Drawing Sheets

(56) References Cited

U.S. PATENT DOCUMENTS

2016/0071318 A1* 3/2016 Lee .................. G06T 17/00
                                                 345/419
2016/0094830 A1   3/2016 Taubin et al.
2016/0313114 A1  10/2016 Tohme et al.

OTHER PUBLICATIONS

Moreno et al, "Rapid Hand Shape Reconstruction With Chebyshev Phase Shifting", 2016, publisher: 2016 Fourth International Conference on 3D Vision, Published in: USA.

* cited by examiner

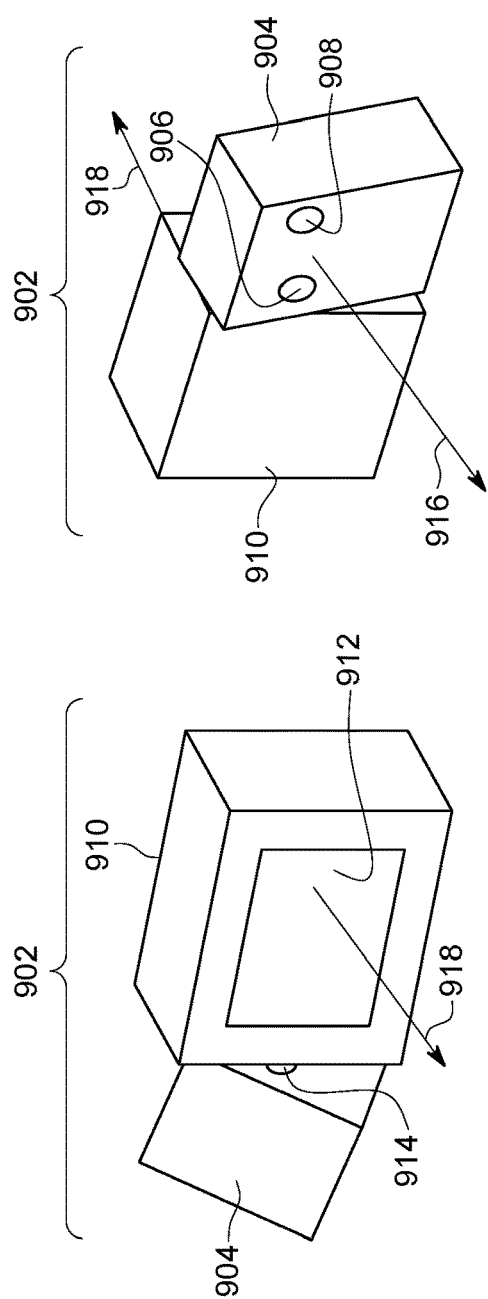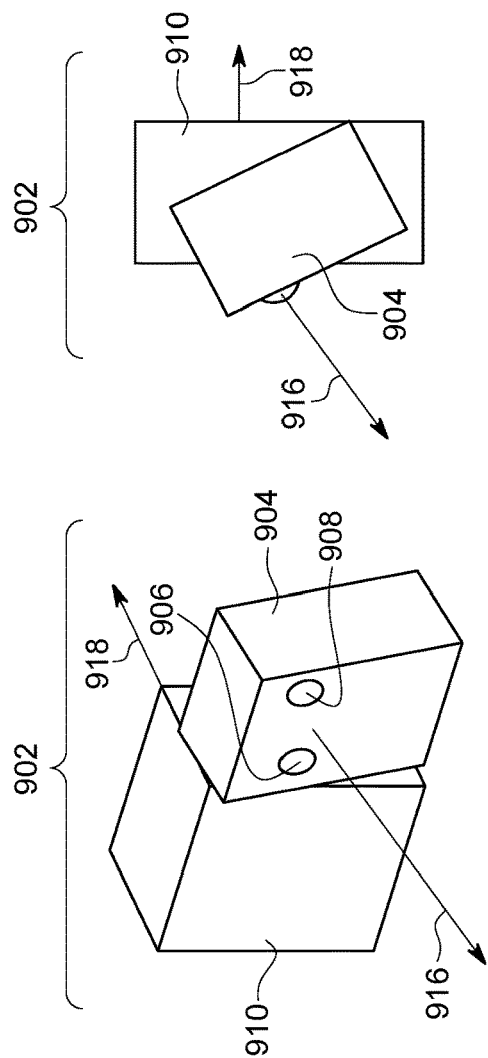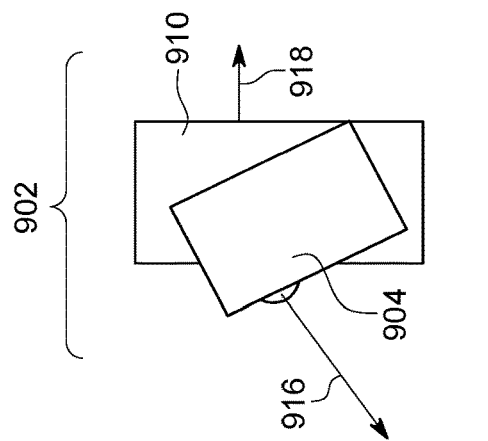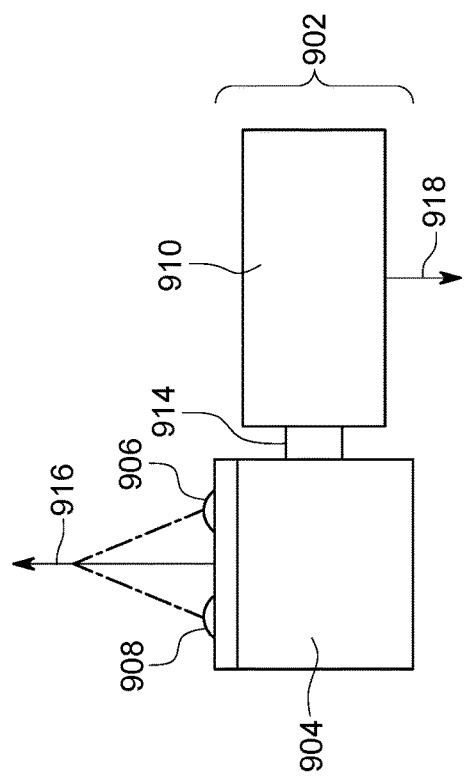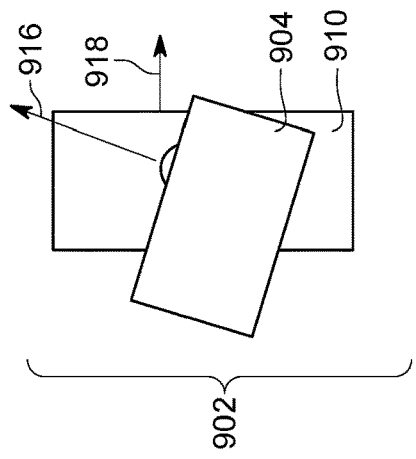

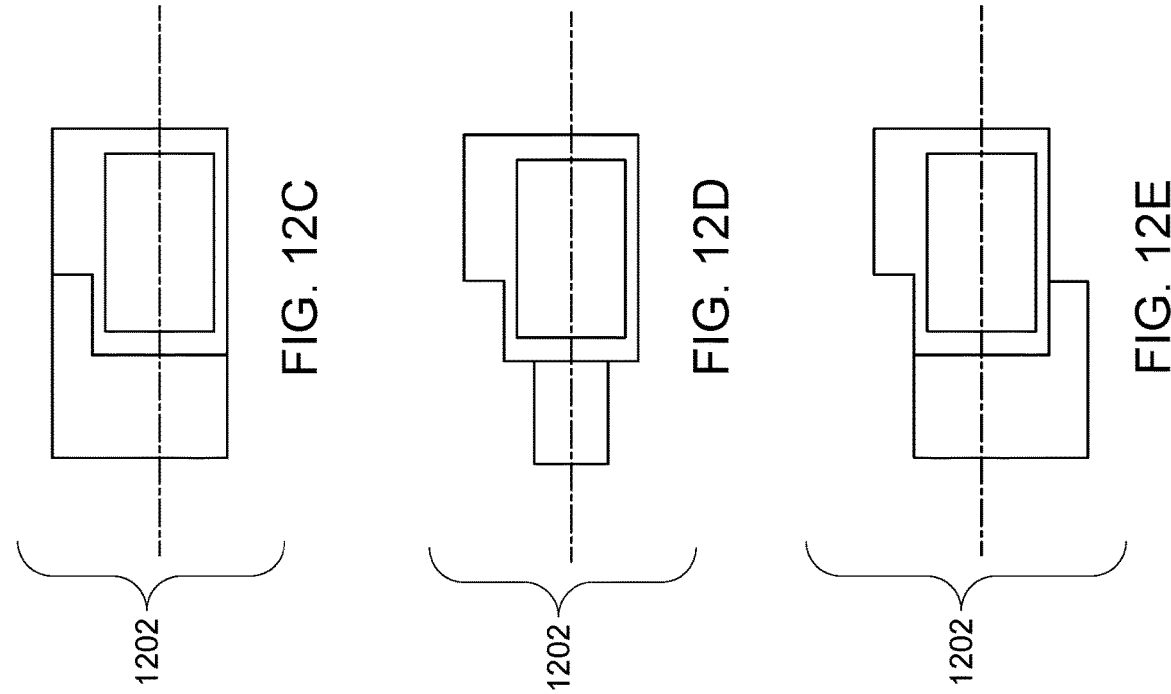
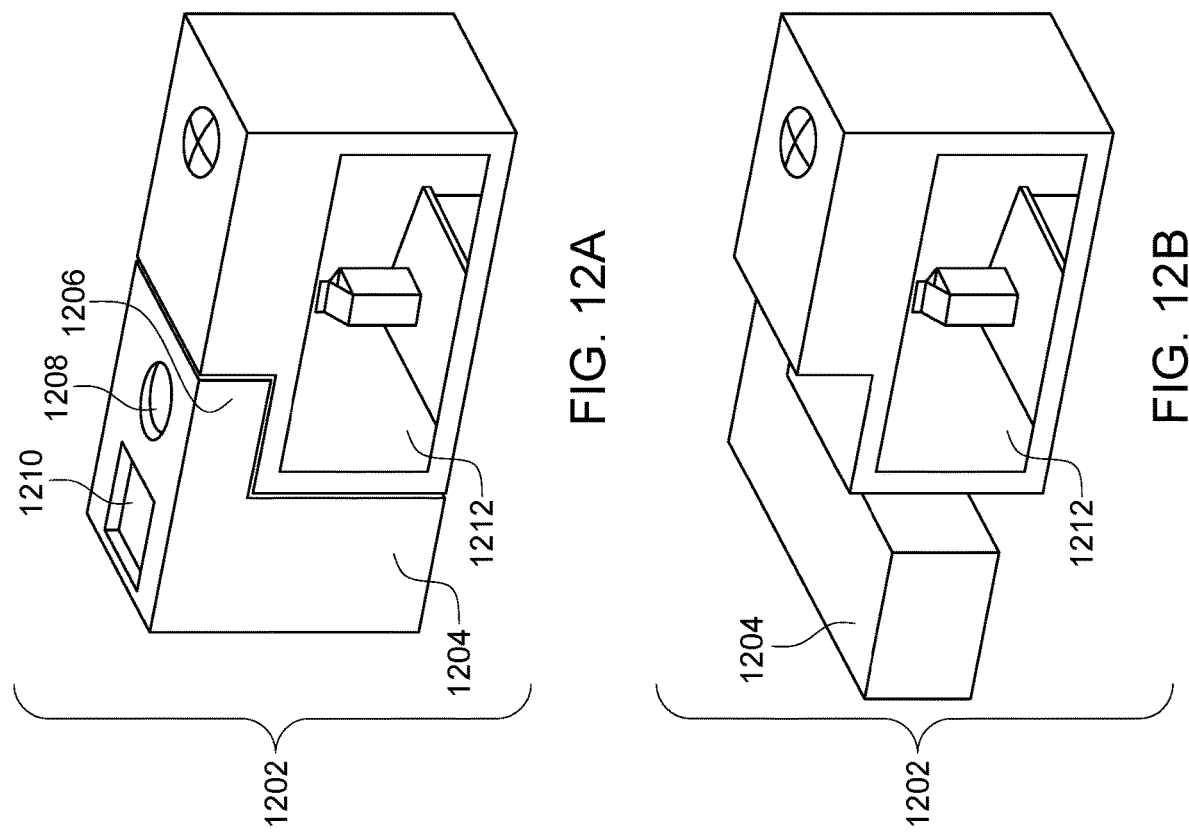

THREE-DIMENSIONAL SCANNING DEVICE AND METHODS

RELATED APPLICATION

This application claims the benefit of U.S. Provisional Application Ser. No. 62/454,660, filed Feb. 3, 2017, entitled THREE-DIMENSIONAL SCANNING DEVICE AND METHODS, the entire disclosure of which is herein incorporated by reference.

FIELD OF THE INVENTION

The present application relates to three-dimensional (3D) scanners that can be used to create digital 3D representations of physical objects.

BACKGROUND OF THE INVENTION

There is a growing need for high-accuracy, low-cost 3D scanning processes that can tolerate challenging conditions such as relative motion between scanner and scanned object, non-Lambertian materials and a variety of lighting conditions.

Structured Light (SL) techniques are the best current methods for accurate capture of three-dimensional (3D) shapes. These are active techniques that illuminate objects or environments of interest with specially designed patterns of visible or invisible light. Images of the objects and/or environments are then captured with one or more cameras while the special patterns are illuminating the objects and/or environments. The 3D geometry is calculated from the images with triangulation using knowledge of relative angle, displacement and optical factors for the camera and projector. The active light source allows results to be relatively invariant to different material and environmental properties such as color, texture and ambient illumination. Modern light projection engines, image sensors and digital signal processing (DSP) device technology can project and capture high resolution images at high frame rate reliably and accurately.

The important qualities of the results of structured light techniques are determined by the characteristics of the patterns (and usually the temporal sequence of patterns) that are projected onto the object or environment to be captured. The purpose of the patterns is to encode information that enables camera image coordinates to be directly related to projected image coordinates. Projected patterns typically encode the projector image column or row coordinates so that with the use of optical and geometric calibration information, it becomes possible to use optical triangulation to identify 3D space coordinates of the object being scanned which correspond to each pixel in the projector coordinate space or sometimes each pixel in the captured camera images.

Structured light patterns are typically classified according to whether they allow retrieval of 3D coordinates corresponding to discrete projector pixel locations or whether they allow sub-pixel (i.e. continuous) measurements. Continuous patterns may be able to find a different 3D coordinate for each camera pixel coordinate, or even camera sub-pixel coordinates, whereas, discrete patterns only identify positions corresponding to discrete projector pixel coordinates. Results from discrete techniques may only have as many 3D points as projector pixels, whereas 3D models resulting from conventional continuous techniques may have as many 3D points as camera pixels. See, e.g., D. Moreno, W. Y. Hwang and G. Taubin. Rapid Hand Shape Reconstruction with Chebyshev Phase Shifting. 2016 *Fourth International Conference on 3D Vision,* the contents of which are hereby incorporated by reference for useful background.

Conventionally, continuous techniques require better control of projected colors and intensities as well as camera to projector color and intensity correspondence and calibration of colors and intensities is necessary. In contrast, discrete techniques may not require this level of control and calibration with the downside that they may be slower and yield lower resolution.

Many continuous techniques, generally known as Phase Shifting (PS) encode a projector axis (typically the X axis of the projected image) as sinusoidal grayscale or color patterns. PS techniques are more tolerant of projector defocus which is unavoidable when using large optical apertures typical in digital projectors.

Current PS 3D scanning techniques require capturing multiple images of an object or scene per static data set and generally assume in their algorithms that the images are of the same scene from the same vantage point. Therefore, they have a requirement of little relative motion between scanner and object or environment during the entire multiple-image capture duration for acquisition of each individual dataset. To a certain extent, the limitations of relative motion can be overcome using higher and higher frame rates, but there are direct advantages to be had in 3-dimensional accuracy, data quality and quantity and color accuracy and mapping accuracy if the number of images to be captured per data set can be reduced, and especially images under the influence of non-uniform illumination patterns.

SUMMARY OF THE INVENTION

According to one aspect, a handheld data acquisition system for capturing 3D object shape data comprising a user feedback screen and a scanner module configured such that the scanner module may be rotated with respect to the feedback screen and the user can scan objects including hard-to-reach areas while still being able to view feedback about the on-going scanning process.

One aspect of the disclosure provides a data acquisition system, comprising: a display module; a sensor module; a light-emitting module.

In one example, the sensor module comprises a first sensor and a second sensor.

In one example, the second sensor has a larger field of view (FOV) than the first sensor.

In one example, the display module is rotatable relative to the sensor module via a connection member.

In one example, the light-emitting module comprises at least one of: a projector, an array of light emitting diodes (LEDs), or a light emitting screen.

In one example, at least one of the first sensor and the second sensor has a primary camera axis and the light emitting module has a primary light emission axis such that an angle between the primary camera axis and the primary light emission axis is approximately 0 to 30 degrees.

Another aspect of the disclosure provides a method of scanning an object in an environment, comprising: projecting light on the object; capturing at least a first image of the object with a first sensor; capturing at least a second image of the environment with the second sensor; generating metadata from the second image; and associating the metadata with the first image.

In one example, the method further includes storing the first image and the associated metadata in a searchable database.

In one example, the metadata comprises at least one of: information relating to a scanning system; information relating to one or more objects in the environment; information relating to other sensor data; information relating to the object; information relating to a user conducting the scanning; or one or more correlations between characteristics of the object and the environment.

Another aspect of the disclosure provides a method of scanning an object comprising: capturing scan data of a first object in a first scan mode; comparing the scan data to a predetermined threshold; and capturing scan data of the first object in a second scan mode based upon the comparison to the predetermined threshold.

In one example, the second scan mode comprises a higher resolution than the first scan mode.

In one example, the method further includes computing coverage or boundaries of 3D data relative to the first object identified in 2D images.

In one example, comparing the scan data to a predetermined threshold comprises comparing the coverage of the 3D data to the predetermined threshold.

In one example, the second scan mode initiates automatically and free of user input.

Another aspect of the disclosure provides a 3D scanning method comprising: capturing a plurality of 3D data sets of an object while the object is grasped and rotated by a hand; identifying data portions that are not consistent among the plurality of 3D datasets; removing the inconsistent portions of the 3D datasets to create trimmed datasets, wherein the inconsistent portions correspond to the hand; aligning the trimmed datasets; and combining the trimmed datasets to create a unified result that represents the shape of the object being scanned without the hand.

In one example, the method is performed without releasing the grasp on the object.

Another aspect of the disclosure provides a 3D scanning method, comprising: capturing one or more images of an object with a sensor; displaying the one or more images of the object on a display; and displaying real-time visual feedback while displaying the one or more images of the object regarding at least one of accuracy or data density of the one or more images.

In one example, the real-time visual feedback comprises differentiated areas on the object displayed in different colors or textures representing at least one of accuracy or data density.

BRIEF DESCRIPTION OF THE DRAWINGS

The invention description below refers to the accompanying drawings, of which:

FIGS. 9A-E show examples of a 3D scanner device;

FIG. 12A-12E shows several views and options for an embodiment of a 3D scanning device;

DETAILED DESCRIPTION

Figure 1:
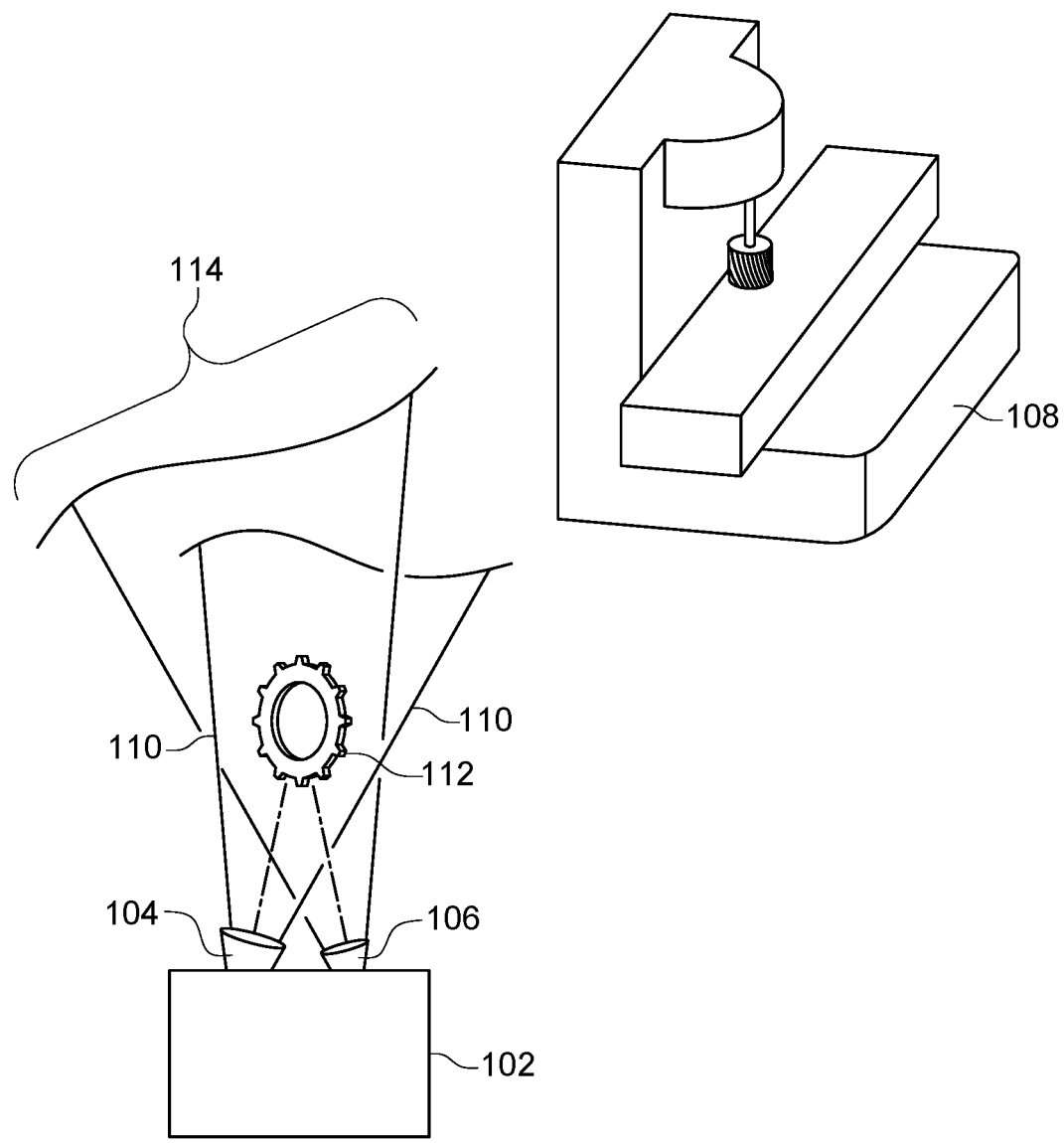
FIG. 1 shows a Phase Shift (PS) scanner device.

FIG. 1 shows a phase shift (PS) 3D scanner 102. Scanner 102 has a projector 104 and a sensor 106. The 3D scanner 102 (also referred to as a scanner) is a device which collects depth information about its surroundings or objects within its sensing range.

3D scanners typically use sensors and/or cameras to gather information about their environment. Some 3D scanners also encode their environment with light patterns using a light source or projector which may have pixels or discretely accessible coordinates within the image or light pattern they project. This encoding may make it possible to determine which projector coordinate created light that strikes a given location in the environment or on a particular object.

3D scanners typically use light sensors. These may be an electronic sensors that detect light intensity and optionally color. Sensors may be charge-coupled-device (CCD) and complementary metal-oxide semiconductor (CMOS) devices or any other device that creates a signal that changes depending upon incident light. The signal is typically electronic, but may also be chemical or physical as in the case of conventional film.

For the purposes of this description, the terms "sensor" or "light sensor" can be taken broadly to include a light-detecting element (CCD, CMOS, etc.) that resolves images into pixels having varying grayscale or color (e.g. red, green, blue or cyan, magnetic, yellow) intensity values and any associated optics—which can be a fixed or variable lens assembly defining an optical axis. The optical axis can be perpendicular to the image plane of the light-detecting element or oriented at a non-perpendicular angle thereto. The optics, when variable, can be based on a mechanical or liquid lens technology, among others and can include autofocus circuitry implemented according to known or custom techniques.

In one example, a 3D scanner may be embodied as a camera. The camera can have a housing, one or more optical elements (e.g., lens, filter, etc.) for focusing or filtering light either embodied within the housing or exterior to the housing, with the sensor and processing circuitry housed within the housing. The camera may optionally include a display to provide a preview of a scene to be imaged.

3D scanners may use light sources (e.g., a light emitting module). One type of light source is a projector. Most projectors are able to modulate light that they emit in space and/or time. Many projectors are able to project pre-determined or dynamic images. Projectors may have a focal range or they may be focus-less (as in the case of laser-projectors). Projectors may use visible or invisible light or other wavelengths of electromagnetic radiation. Other types of light sources are also possible including light emitting diodes (LEDs), light emitting screens such as LCD, OLED, etc., and incandescent bulbs.

Resolution of image sensors and cameras is typically described in terms of pixel dimensions or total number of pixels (megapixels).

Resolution of 3D scan data is typically described in terms of its inverse, point spacing (e.g. 0.1 mm between points). People often refer to "a resolution of X.XX mm" which is technically the point spacing. Sometimes a differentiation is made between the horizontal resolution and the depth resolution as these are typically different and are influenced by different factors within the same 3D scanning system.

The sensor 106 can be a camera, charge-coupled device (CCD), complementary metal—oxide—semiconductor (CMOS) or other type of sensor. Projector 104 is configured to project appropriate structured light patterns (not shown) on an object being scanned 112. Projector 104 is configured to have a field of view (FOV) 110. FOV 110 is the angular and spatial region where light is projected. Scanning camera 106 is configured to have a field of view (FOV) 114 that is narrow so that it captures high-resolution data from light reflected from object 112. FOV 114 captures little or incomplete information about the environment and other objects in the environment such as machine 108 may not be able to be captured, because scanning camera 106 is configured to capture objects illuminated by projector 104 and not objects that are farther away or illuminated only by ambient illumination. Therefore contextual information and metadata that could potentially have been deduced from photo capture data of the environment and surrounding objects may be lost.

Figure 2:
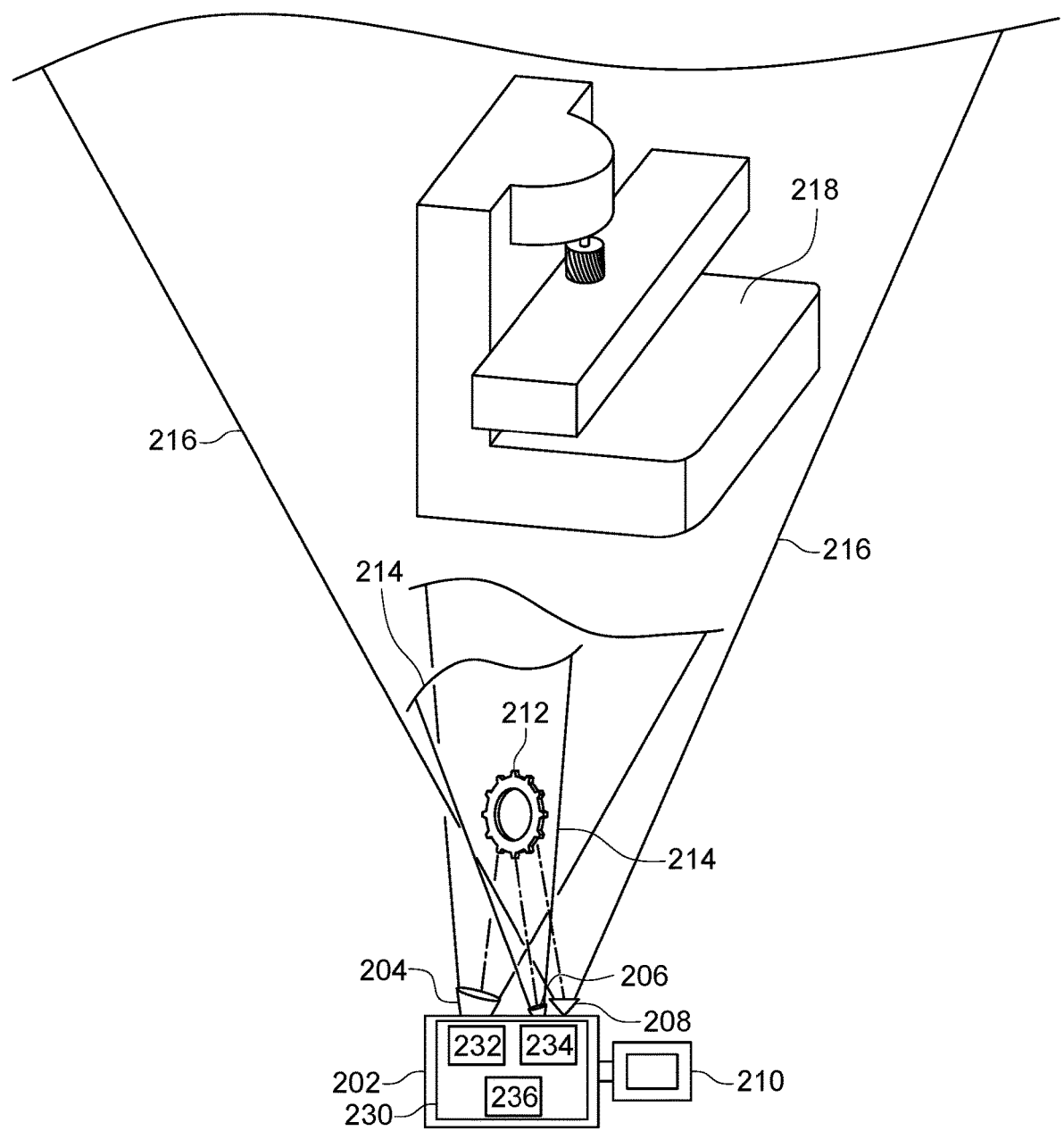
FIG. 2 shows a PS scanner device with auxiliary camera.

FIG. 2 shows a schematic embodiment of a scanner device 202. Scanner 202 has a projector 204, a sensor 206, an auxiliary sensor 208 and a feedback screen 210. The projector 204 can be any type of projector as described above with reference to FIG. 1. The sensor 206 and/or the auxiliary sensor 208 can be any type of sensor as described above with reference to FIG. 1.

As described above, and with respect to sensors 206 and 208, the terms "sensor" or "light sensor" can be taken broadly to include a light-detecting element (CCD, CMOS, etc.) that resolves images into pixels having varying grayscale or color (e.g. red, green, blue or cyan, magnetic, yellow) intensity values and any associated optics—which can be a fixed or variable lens assembly defining an optical axis. The optical axis can be perpendicular to the image plane of the light-detecting element or oriented at a non-perpendicular angle thereto. The optics, when variable, can be based on a mechanical or liquid lens technology, among others and can include auto-focus circuitry implemented according to known or custom techniques.

Projector 204 can be any type of device configured to project any type of light, such as an array of light emitting diodes (LEDs). Projector 204 is configured to project appropriate structured light patterns e.g., light of known or pre-determined pattern(s), such as gridlines, zebra stripes, etc. (not shown) on an object being scanned 212. Light projected by projector 204 may be visible light, infra-red (IR), ultra-violet (UV), or any other wavelength or combination of wavelengths of electromagnetic radiation. In one example, the projector 204 and the sensor 206 are spaced apart by approximately 15 to 150 mm, e.g., 15 to 150 mm +/−5 mm. The projector 204 and the sensor 206 can be in rigid alignment with one another, while in another example may be movable relative to one another. The sensor 206 can have a primary camera axis and the projector 204 can have a primary light emission axis. In one example, the angle between the sensor and light emission axes is approximately 0 to 30 degrees, e.g., 0 to 30 degrees +/−5 degrees.

Sensor 206 can be any type of image sensor capable of capturing and imaging a scene, such as CMOS or CCD devices. The sensor 206 or the auxiliary sensor 208 can be operatively connected to one or more processor assemblies 230, respectively, to process or operate on the data received by the sensor 206 and/or 208. In one example, the sensors 206 and 208 can be operatively connected to a single processor assembly, while in another example each sensor 206 and 208 can be operatively connected to a separate, discrete processor assembly. The processor assembly 230 main processor 232, a graphics processing unit (GPU) 234, and a memory module 236 that may store instructions for executing any of the processes described herein, as well as any data relating to light patterns to be displayed by projector 204. The sensor 206, alone or in combination with auxiliary sensor 208 described below, can collect 3D scan data and generate a 3D model of the object. Sensor 206 is configured to have a field of view (FOV) 214 that is narrow so that it captures high-resolution data from light reflected from object 212, for example resolution may relate to a point spacing of 0.2 mm or less. FOV 214 captures little or incomplete information about the environment. Auxiliary sensor 208 may have a wider FOV 216 than a FOV associated with sensor 206. Auxiliary sensor 208 may have any resolution. In some embodiments, sensor 208 may have a high resolution (for example 50 megapixels) in order to collect extremely detailed information about the scene, or it may have a low resolution (for example 0.5 megapixel) to gather some information about the environment but with reduced bandwidth and processing requirements. Sensor 206 may have a diagonal field of view of less than approximately 100 degrees, e.g., 60 degrees +/−40 degrees, while the auxiliary sensor may have a diagonal field of view of greater than approximately 60 degrees, e.g., 60 to 180 degrees. Auxiliary sensor 208 may also be configured to capture image data at a lower resolution than sensor 206. Sensor 206 and/or the auxiliary sensor may capture streaming video in addition to single frame images. FOV 216 may be configured to capture some information about object 212 and also much more information about the environment. For example auxiliary sensor 208 may be able to capture other objects and details in the environment (for example a factory environment) such as machine 218. Other types of environments may have other types of objects and details. Outdoor environments may have grass and trees. Retail store environments may have products, shelves, lights and price signs. A home environment may have a couch and pictures on the wall.

In one example, one sensor, e.g., sensor 206 could be used to capture images of an object being 3D scanned. These are primarily images of the object under the influence of projected illumination patterns, but also potentially with full illumination. It may have a field of view just wide enough to capture objects in front of the scanner device. The other sensor, e.g., sensor 208, would be used to capture more of the scene or environment. This may benefit from a wider field of view. Images of the wider environment can be used to extract information about the environment such as identifying other objects in the environment and the type of environment.

A 3D model of an object can be created using a single sensor (e.g., sensor 206) or multiple sensors. In one example, a single sensor used to create the 3D model of the object (e.g., sensor 206) can be configured for monochrome capture (if the projected structured light images are monochrome (e.g. grayscale)), however it may be often desirable to also capture color images of both the object being scanned and of the scene (e.g., the room or other surrounding environment). To that end, auxiliary sensor 208 with wider FOV 216 may enable more complete capture of color and environment data and may also enable a better scanning experience for the user because the user can see more of the environment in feedback screen 210 and therefore may be able to more adeptly scan the areas of interest of the object. Additionally, the wider FOV 216 available to scanner 202 as compared with scanner 102 of FIG. 1 means that scanner 202 may be able to better track its alignment and orientation with respect to object 212 as it is moved around the environment. This is because scanner 202 and associated hardware/software may use computer vision techniques and the wider FOV provides more environmental information and a wider spread of visual points for the computer vision algorithms to track which results in more precise and more robust alignment.

Another advantage of a configuration such as scanner 202 is that the resolution (number of pixels captured) of sensor 206 may be lower than the desired scene image capture. For example sensor 206 may have a resolution of 1280×720 pixels (approximately 1 megapixel), whereas sensor 208 may have a resolution of 1920×1080 (approximately 2 megapixels), but any combination of resolutions can be made to work with different advantages and disadvantages.

Auxiliary sensor 208 and wider FOV 216 may enable capture of extensive photo and video data of the environment at the same time as objects such as object 212 are being scanned. And this photo and video data may be saved and may be analyzed. In particular, the present system uses computer vision algorithms and object recognition algorithms and machine learning (ML) and artificial intelligence (AI) to identify objects, environments and context around the objects being scanned. This information is stored at one or more memory or data stores (such as RAM, ROM, flash memory, or any type of memory described below with respect to FIG. 14) as metadata along with the 3D object scan data. The coupling of metadata with scan data can enable and improve many uses of the 3D scan data as well as improving manufacturing and assembly of physical components and systems.

The use of a 3D scanning device with physical components, computing hardware and software capable of capturing and storing precise and highly-detailed metadata in association with 3D datasets solves several technological problems:

One problem that the use of metadata solves is that it allows components to be manufactured on-demand with greater accuracy and lower rate of misfit or unwanted physical attributes. Advantageously, in the present system and/or methods, when a particular machine component is scanned in-situ or within the environment where the machine resides, metadata about the machine and the machine's other components may be automatically gathered and stored as an integral piece of the database (which will also include the 3D data collected by the scanning process). Then, when the scanned component is prepared for manufacturing, the associated metadata about the machine such as tolerances, materials, keyway dimensions, chamfers, lubrication data, date of manufacture of the machine (and therefore likely wear, fit and operation considerations), known necessary or desirable design changes, product recalls, safety information, best practices, etc., may be used to adjust the component design and manufacturing instructions or processes to yield a substantially different and better performing replacement part than would have been the case if the replacement part was fabricated using the directly scanned 3D data alone.

Another example of an improvement enabled is when a component to be inspected, documented or replaced is scanned and the component's characteristics are influenced by the environment. For example if an o-ring is scanned, its deformation may be captured within the 3D dataset captured by the 3D scanner. But if that deformation is influenced by the ambient temperature, it may be useful for the ambient temperature to be stored as metadata in the database along with the 3D data. If that o-ring later fails and an investigation looks at the 3D data taken as part of the inspection process, having the temperature data available at the time the 3D data was captured can enable better decisions about the design and replacement with a more appropriate component.

Another specific technological problem solved is making 3D datasets more "searchable" —e.g., that searches performed with highly detailed criteria can return results that specifically match those criteria based on metadata. For example, if someone searches for a 3D data file of an "acoustic guitar with spruce top, gold plated tuning heads and sound-hole pickup in good condition, that search can only be successful if metadata about materials, condition and sub-components or accessories is stored with the 3D data.

Extending his concept further, even more extensive metadata solves the problem of enabling semantic interactions: For example with enough collected metadata, an engineer can scan a component and perform a search for other components that "fit" the scanned component, where in this case "fit" may mean "having a hole pattern that accepts six 10 mm dowel pins on a 150 mm bolt-circle whose center is 200 mm from the object's base".

Another way that metadata solves a problem and improves work processes is by providing context. For example, a shoe designer may be very interested to be able to find shoe models or obtain physical samples of shoes that have been "modified" or are unique items, whereas a consumer shopping online for shoes is more likely to specifically want to see the "official" or "manufacturer sanctioned" version of a shoe model. The designer's work process and physical results including shoe designs, shoe prototypes and even shoe manufacturing machinery may be improved by the greater efficiency enabled by the capture and generation of rich metadata along with 3D datasets. Similarly, the process and results for the shoe-shopping consumer may be improved with fewer returns, less wasted time and lower failure rate.

In another example, metadata can include information relating to the scanning system (e.g., scanner type, and serial number), the parameters used by the scanning process (e.g., example brightness, color capture, bit depth, etc.) a global accuracy of scan, a maximum estimated error in scan data file, a local accuracy (accuracy per scan data point or per location), a data density/resolution, inferred place, related objects, and use-cases for the 3D data among other things. The metadata can also include information relating to other objects in the room, such as the type environment around an object of interest (e.g. manufacturing line, laboratory, natural outdoor environment, urban environment, retail location, hardware store, school, home, kitchen, living room, garage, etc.). The metadata can also include other sensor data, such as temperature, time spent scanning to create the scan data file, scanning motion profile (e.g. was the scanning motion smooth or was there a lot of jitter during the scanning process), orientation of objection (e.g., is the scan relating to a bottom, top, side, etc., or orientation of scan data with respect to gravity, GPS coordinates, prevailing acceleration, prevailing velocity, and position while scanning. The sensor data can be generated from one or more sensor modules located onboard the scanning device, such as an accelerometer, GPS, compass, gyroscope, etc. Other metadata can include object type (e.g., motorcycle brake lever, 5C collet, etc.), sub-features or sub-parts (e.g., bolt type and number, NEMA 17 hole pattern, ⅛" shaft key, etc.), material or multiple materials that the object is made out of, object condition (rusty, new, dented, scratched, dusty, painted, marked etc.), OEM part number, supplier, cost, relative condition or differences to OEM part (e.g., that a connector is different/changed compared to current stock part from vendor), identify other substances (leaking oil, accumulated dirt, etc.). The metadata can also include information relating to type of user or source of the data, such as OEM (official version of part), skill of user (expert user, consumer user, engineering user, novice, child, artist etc.) This metadata can be useful when a consumer searches an on-line database of scans for a running shoe they are interested in potentially purchasing. Existence of the metadata ensures that the running shoe is an "official" version rather than a scan of a used shoe so a user can specify "OEM version" as part of the search. Additional metadata can include whether the data file has been modified after scanning, whether the scanned part appears to have been modified from the generic or canonical version of the part, a description of item that could be intentionally added by the user, potentially via voice recognition at time of scan or afterward. Additional metadata can include inferred metadata, which can be inferred from other collected metadata. Inferred metadata can include metadata obtained by making correlations between characteristics of the direct data (e.g. scene images and object images and 3D data) and statistical database(s) of other types of indirect data (e.g. materials, environment types, or other types of objects likely to be present in the environment). Inferred metadata can provide semantic and searchable meaning, similar to knowledge not directly represented in the data that a human could deduce about an object or scene based on looking at images). The scan data and/or associated metadata may be stored in a searchable database organized using a variety of known techniques. In this regard, the scan data can include 3D shape data (as will be described in detail below), and the 3D shape data may be searchable based upon the metadata.

A non-limiting example of the use of metadata is as follows. An engineer is creating a new assembly in CAD. The engineer can have access to a 3D scanned data file of a motor that the engineer needs to use during assembly. In the engineer's design, he needs to ensure that the position of the motor shaft is within a certain tolerance of another datum in the assembly which requires knowing the dimensions of the motor mounting holes within a certain maximum error. If the scan data file of the motor has associated metadata about the accuracy and/or maximum error in that scan, he can build assembly and meet his requirement. Without this metadata, the scan data could not be used to build the assembly with the required confidence of tolerances.

Additionally, photo and video data captured by auxiliary sensor 208 may enable partial or complete reconstruction of the scene or environment surrounding the object being scanned. Different algorithms (e.g. photogrammetry) may be used for 3D reconstruction of the scene from photo data as compared to the specific SL techniques used to reconstruct the 3D model of the object being scanned. Another optional configuration of a scanner such as scanner 202 is one in which the frame rates of sensor 206 and auxiliary sensor 208 are different. Scanning sensor 206 may use a high frame rate such as 30, 60, 90, 120, 240, or up to approximately 720 frames per second (FPS), (or it may use some other number of FPS) to capture the scene with illumination by SL patterns very rapidly to minimize blurring and mis-alignment of multiple captured frames despite some amount of relative motion of scanner 202 and object 212. In contrast, auxiliary sensor 208 may capture photo and video at a lower frame rate, for example 12 or 24 FPS (or any other FPS) or may capture individual photos or groups (e.g. bursts) of photos. Additionally, sensor 206 and auxiliary sensor 208 need not capture at exactly the same times, so that for example the scene and object 212 may be illuminated by a SL pattern via projector 204 while sensor 206 captures image(es), and auxiliary camera may capture frames or video while projector 204 is either not projecting anything or is projecting something different (for example full illumination or a uniform color), or auxiliary sensor 208 may capture frames including a mix of all of the above and potentially unwanted frames may be discarded during the process or afterward.

For example, sensor 206 and/or the auxiliary sensor 208 can be configured to capture both structured light images and normal illumination photographic images during the same scanning session. Thus, the projector 204 can alternately project a structured light pattern and a normal illumination pattern (full illumination or uniform color) at some predetermined interval. In one example, the interval can be approximately 0 to 100 ms, e.g., 0 to 100 ms +/−5 ms. Preferably, the interval is approximately 20 milliseconds e.g., 20 milliseconds +/−5 ms. The sensor 206 and the auxiliary sensor 208 can alternatively capture image data to correspond to the alternatively emitted light patterns, e.g., the sensor 206 captures the structured light pattern while the auxiliary camera 208 captures the normal illumination pattern. The auxiliary sensor 208 may capture normal-illumination images of the environment or surroundings of an object of interest in addition to images of the object in the environment.

By having two sensors dedicated to different, discrete, respective, functions, and allowing the specifications or parameters such as resolution, FPS, bit depth, color, FOV, other optical characteristics, lens design and other characteristics, scanner 202 may be able to achieve more complete and accurate capture of both objects being scanned and the surrounding scene and environment and metadata about the capture circumstances versus scanners that have only a single camera or that have camera specs chosen specifically for SL capture techniques.

Figure 3:
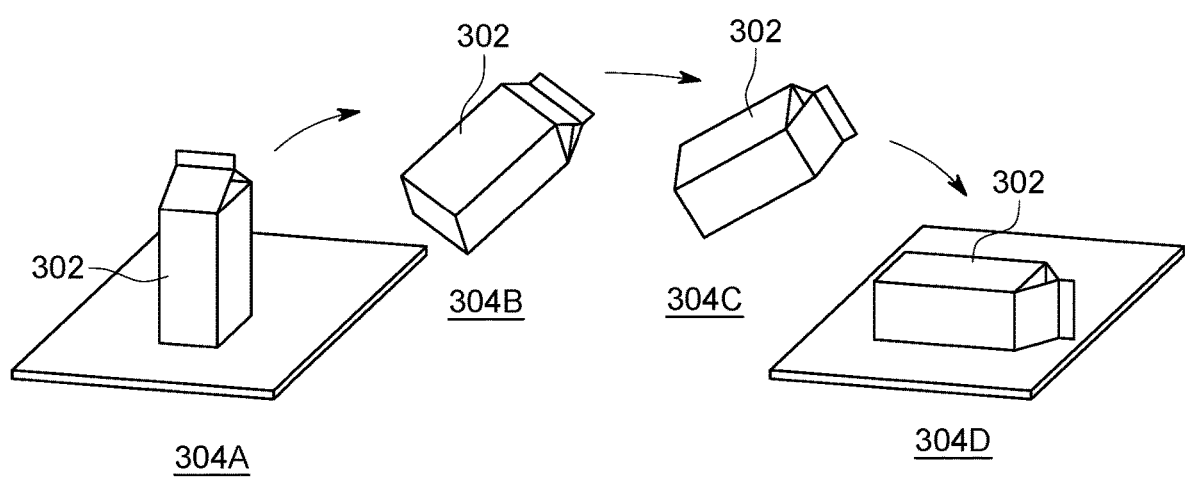
FIG. 3 depicts a 3D scanning process in which the object being scanned is repositioned as part of the scanning process.

FIG. 3 depicts a process of scanning an object 302 in which object 302 is repositioned through positions 304A, 304B, 304C, and 304D as part of the scanning process. Object 302 may be any movable object for which it is desired to obtain a digital 3D representation. A scanner device (not shown here) such as scanner 202 in FIG. 2 may be used to create multiple 3D datasets via a structured light scanning process (or other scanning process). It is often challenging or impossible to scan all areas of an object while the object is in one position. But with conventional scanning techniques, if the object is repositioned and scanned again to create more datasets of the object in a new position, it is often difficult or impossible to align the data sets acquired from different object positions. This is especially true for objects such as object 302 (here shown as a milk carton just for example) that are symmetrical about one or more planes or axes and otherwise relatively smooth or featureless because datasets can be aligned multiple ways with little geometrical error. If there is assumed to be some upper bound on the amount of rotation a most likely alignment could be determined, but this typically could not be accomplished with datasets from the two positions.

In this embodiment of a scanning process, the scanner may take photographic, video or 3D data sets of the object (and potentially the user's hand or other repositioning equipment) throughout the repositioning process. The intermediate result is the generation of many datasets (photos, video and/or 3D) that have been taken with known, small time intervals between them and it can assumed that rotation and translation between incremental datasets is small. By using CV algorithms on photo or video data (such as those available in the OpenCV library as one example) and conventional small-displacement 3D data alignment algorithms such as iterative closest point (ICP) on incremental data sets the relationship (linear and angular displacement) between the two (or more) positions in which the object is scanned can be determined. Using this known displacement, the 3D datasets from the two (or more) positions of object 302 can be aligned, and the data can be merged to create a unified 3D model result with no ambiguity.

Figure 3A:
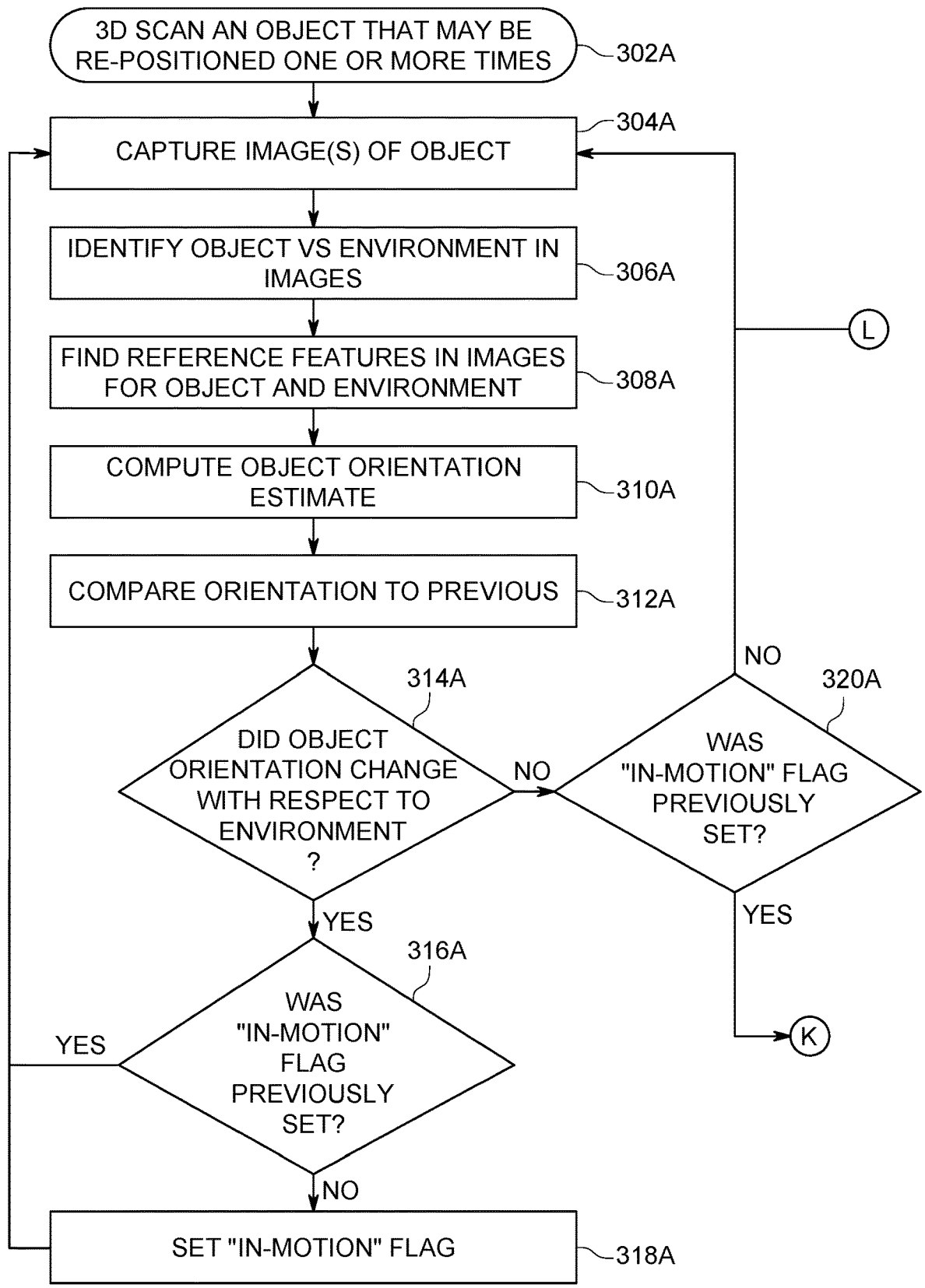
FIGS. 3A-3B are a flow chart depicting a method of 3D scanning an object that may be repositioned one or more times.
Figure 3B:
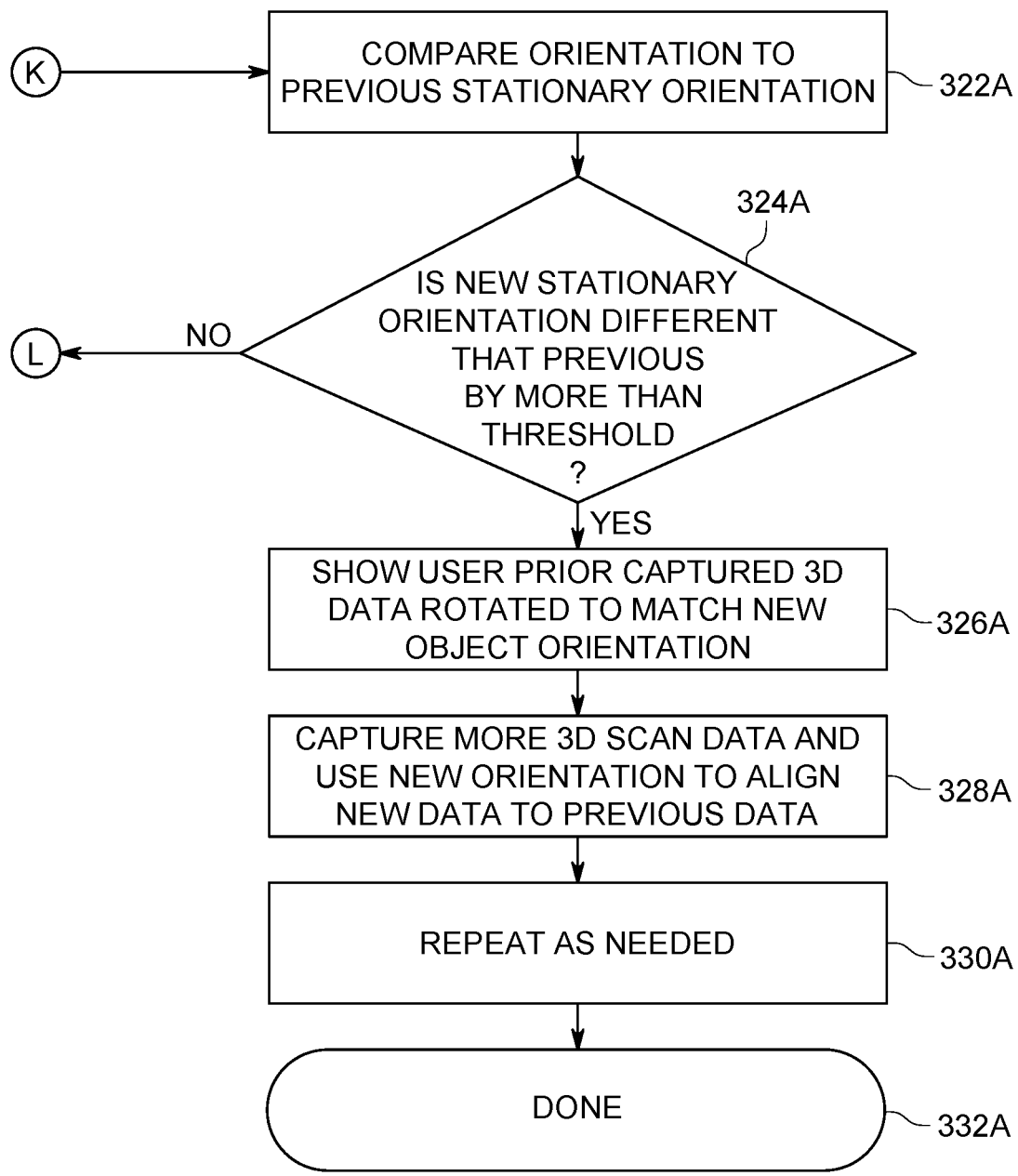

FIGS. 3A-3B are a flow chart depicting a method 302A of 3D scanning an object that may be repositioned one or more times.

At block (also termed a "step") 304A, one or more sensors capture one or more image(s) and/or video and/or 3D data of object.

At block 306A, identify the object vs. the environment in the captured data. This may be done with conventional computer vision (CV) techniques and image data or video data or it may be performed by matching 3D datasets with iterative closest point (ICP) algorithms. The process may involve an iterative process of capturing image, video and/or 3D data from several relative positions of scanner with respect to object and environment.

At block 308A, find reference features in images for object and environment. This may be accomplished via conventional CV techniques on images or video to find key-points, edges, curvature analysis, analysis of color or intensity gradients, and identification of texture features, or it may be performed on 3D data by finding 3D features such as curvature signatures.

At block 310A, compute object orientation estimate and store (e.g., in memory) for later use. This may be accomplished with conventional CV techniques on image or video data or it may be performed on 3D data using ICP and other 3D methods.

At block 312A, compare orientation estimate to previous orientation estimate.

At decision block 314A, determine if object orientation changed with respect to environment.

If "yes" at decision block 314A, proceed to block 316A, where it is determined if an "in-motion" flag was previously set. The "in-motion" flag is an initiation or indication of a state of the object being in motion relative to the environment during capturing of the one or more images.

If "yes" at block 316, optionally the object trajectory (e.g. translational and rotational path and first, second, third and/or higher derivatives) can be computed.

If "yes" at decision block 316A, proceed to block 304A to capture one or more image(s) and 3D data of object. This indicates that the object remains in motion relative to the environment and the system should continue collecting and processing object images, 3D data and object orientation estimates until the system determines that the object has stopped moving.

If "no" at decision block 316A, set "in-motion" flag.

Returning to decision block 314A, if no at decision block 314 then proceed to block 320A where it is determined if an "in-motion" flag was previously set. In this step it is determined if the object was previously in motion with respect to the environment (which was happening if the in-motion flag had been set), but has now stopped moving (which would be true if the system did not detect any motion between this set of images and the previous set of images). If the object was moving and has now stopped, any new 3D data generated will need to be rotated and/or translated in order to align it to any previous 3D data that was collected before the object was moved.

If "yes" at decision block 320A, proceed to block 322A to compare orientation to previous stationary orientation. In this step it is determined that the object was moved but has now stopped moving.

Returning to decision block 320A, if "no," the "in-motion" flag was not previously set, proceed back to block 304A to repeat the image capture process. This set of events means that the object is not moving now and was not previously moving so the system can continue taking data as normal.

At block 324A, determine if new stationary orientation is different than previous by more than threshold. This threshold may represent an amount of movement (translation and/or rotation) of the object relative to the environment, which if exceeded, means that any new 3D data generated will need to be re-oriented to align it properly to any previously generated 3D data.

If "yes" at block 324A, then proceed to block 326A to show user prior captured 3D data rotated to match new object orientation. This ensures that the feedback the user sees on the screen matches the orientation of the real object. So if the user has captured 3D data of the top of an object, then flips the object over, the previously captured data will become flipped on the user-feedback screen so that it properly aligns with new 3D data about the object that is now being collected and displayed.

At block 328A, capture more 3D scan data and use new orientation to align new data to previous data.

At block 330A, repeat as needed until completion at block 332A. At the end of this process, 3D data sets taken of the object in multiple positions may be accurately aligned and unified into a single set of 3D data if desired in order to represent the whole object or more of the object than would have been possible with data captured with the object in only one position.

The process as set forth in FIGS. 3, 3A, and 3B advantageously allows an object being scanned to be repositioned during the scanning process and automatically rotates and unifies data captured from multiple object orientations. This overcomes the disadvantages of prior systems and thus provides a technological solution to the technology problem of difficulty or requiring many steps and manual operations to gather, align and stitch together data about all sides of an object with typical 3D scanners. Typical 3D scanners typically do not allow objects to be repositioned during the scanning process; rather they require collection of multiple separate data sets which must be manually joined via a time consuming, error-prone process.

Figure 4:
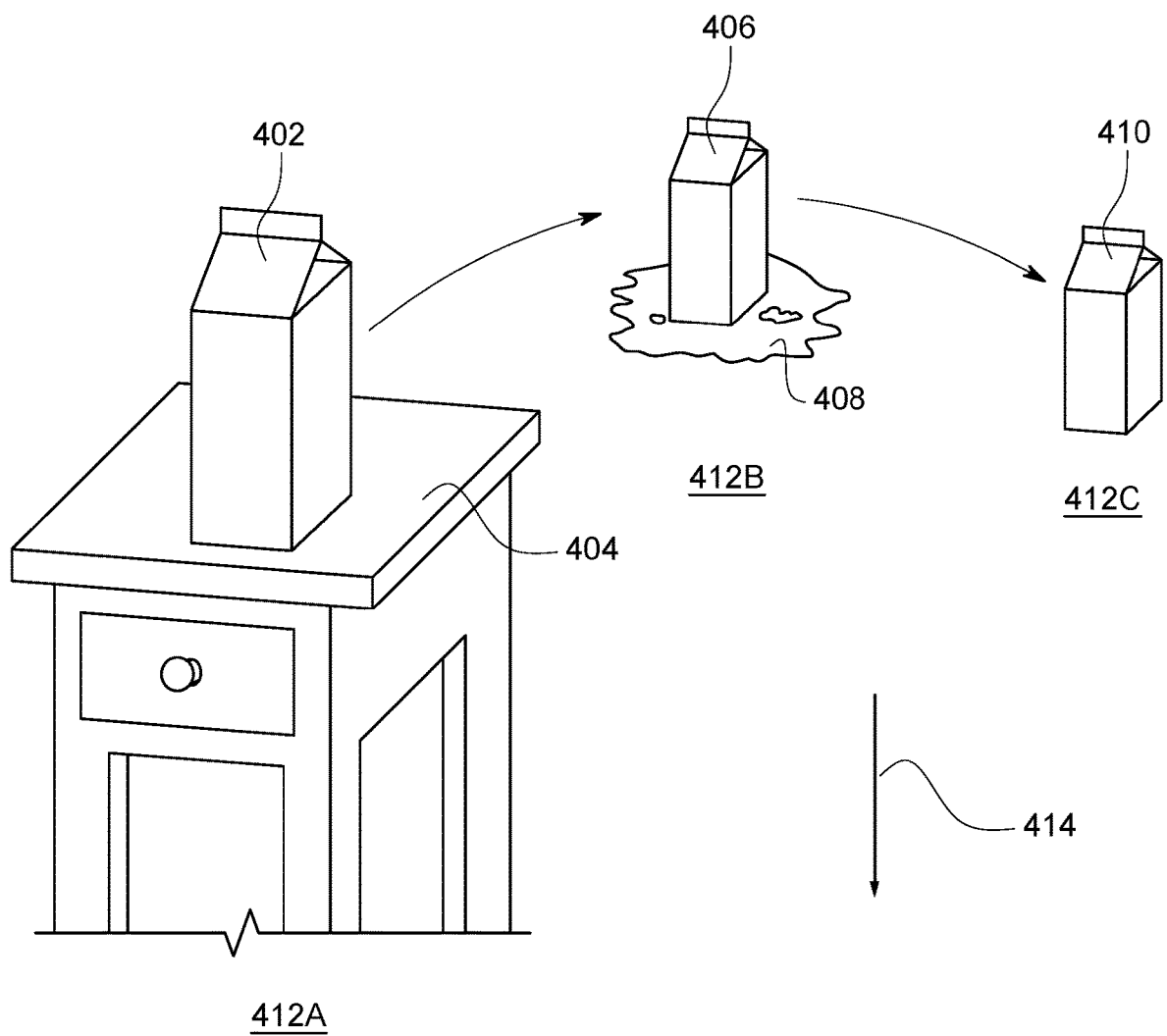
FIG. 4 shows a 3D shape reconstruction process for automatically removing unwanted portions of the 3D data.

FIG. 4 shows a 3D shape reconstruction process in which an object 402 is 3D scanned while sitting on a base 404. This step in the process is labeled 412A. The scanning process captures 3D shape information about object 402 and may also capture some 3D data from base 404. A 3D dataset 406 is shown representing the combined 3D data from both object 402 and base 404. Data 408 that represents base 404 may be identified in a step labeled 412B. Data 408 may be removed automatically in a step labeled 412C to yield a 3D dataset 410 which represents only the object 410 that was intended. Data 408 may be identified by searching for data that represents a group of data points that lie roughly in a plane and lie at the lowest height in the dataset with respect to a gravity vector 414. Data 408 may alternately be identified by segmenting data 406 by color or texture. An accelerometer (not shown) incorporated into the scanner (not shown) may be used to record the predominant direction of the gravitational field (e.g. the gravity vector) during the scanning process so that the "bottom" of the dataset may be identified. It is also possible to segment data 406 based on analysis of photographs with CV algorithms, identification of materials and/or different colors or textures.

The processes set forth in FIG. 4 advantageously allow for automatic identification and removal of data related to a table or other support and yields unified 3D data of only an object being scanned. This is a technological solution to the technological problem that typical 3D scanners experienced, in which typical 3D scanners often gather shape data of a table or other support under an object being scanned and this data must be manually removed which is time-consuming.

Figure 5:
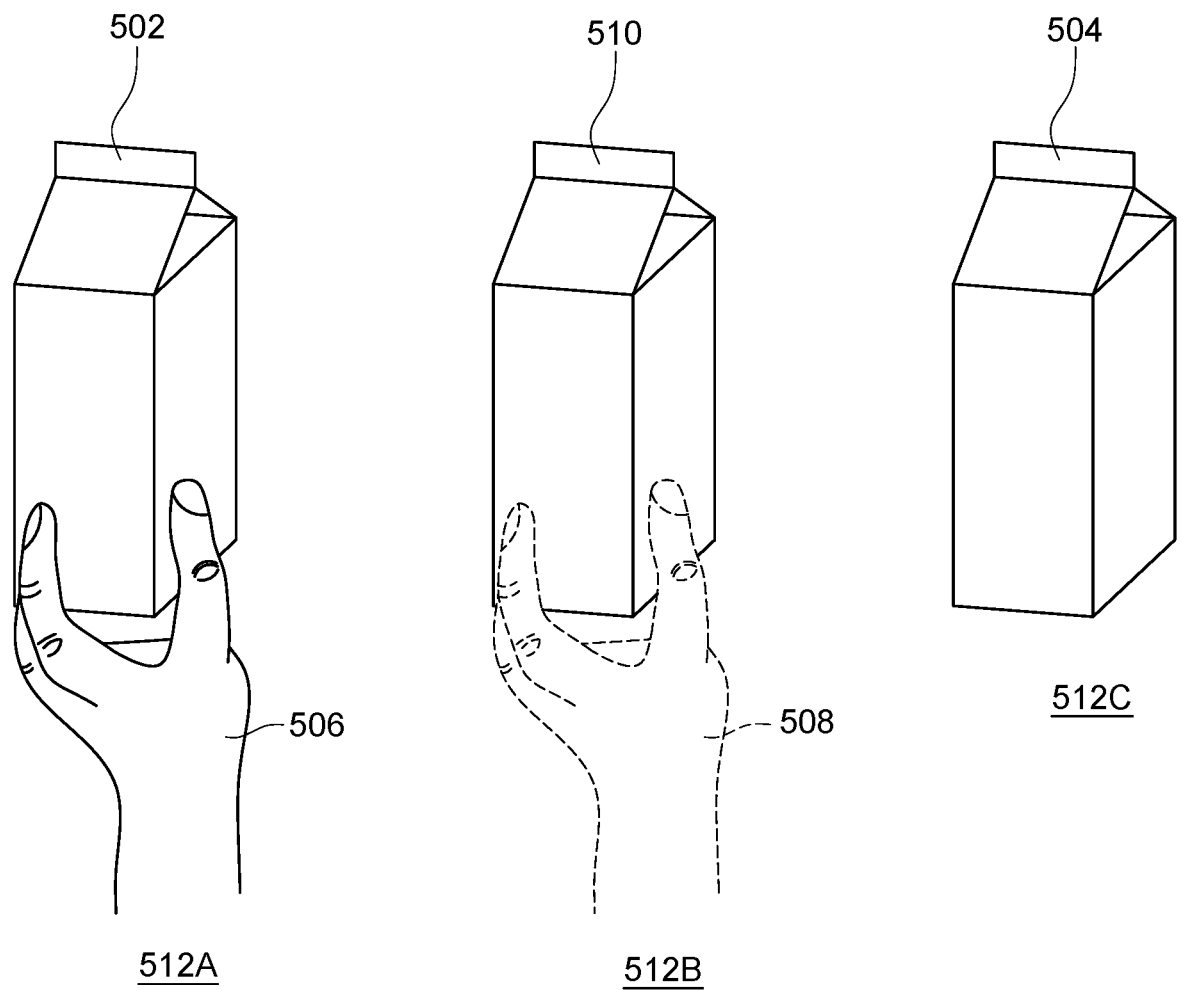
FIG. 5 shows a 3D scanning process in which a hand is removed from the data.

FIG. 5 shows a 3D scanning process in which an object 502 is scanned to create a complete 3D digital representation 504 that represents the shape of object 502 without losing areas of data that might have been inaccessible if object 502 was scanned while sitting on a base. In a first step labeled 512A, object 502 is scanned to capture 3D data and potentially photo and/or video data while being held by a hand 506. Hand 506 may be the hand of the person performing the scanning operation or it may belong to someone else. During step 512A, object 502 may be rotated and translated and repositioned with respect to hand 506 as necessary in order to achieve complete, or substantially (e.g., sufficiently) complete, scanning coverage of the full surface of object 502. Intermediate data sets captured during step 512A may have data created from the shape of hand 506. In a step labeled 512B, computer vision algorithms and 3D data analysis are used on photo and/or video data to identify which subsets 508 of the captured 3D data (and photo data) correspond to hand 506 and which portions of the data 510 correspond to object 502. One way to determine which data is not part of the object is to align some or all the 3D datasets captured and compare the data from the datasets. Subsets of 3D data which are not consistent (i.e. change shape) from one dataset to another may be safely removed and the remaining data from all the datasets may be merged to create a unified data set that should represent only the object without any data from the hand or other movable support. This is because the hand or other movable support will have changed shape and/or position with respect to the majority of the 3D data which represents the object being scanned. Then in a step labeled 512C, the portions of the data which are not consistent across the data sets (i.e. which presumably represented the hand 506 rather than the object) are removed and the remaining datasets are merged to yield the final unified data 504 representing the intended object 502.

Figure 5A:
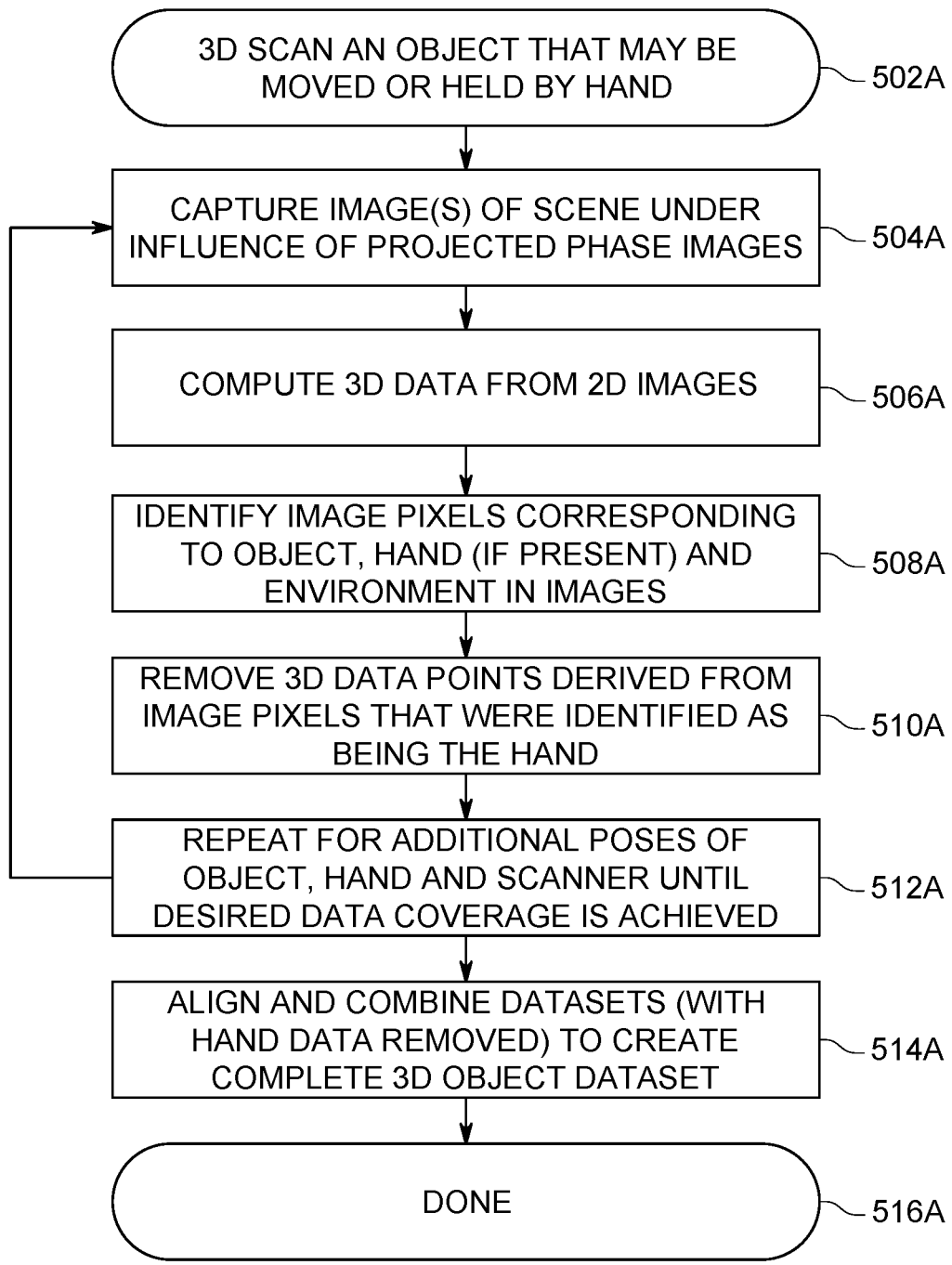
FIG. 5A is a flow chart depicting a method 502A of 3D scanning an object that may be moved or held by hand.

FIG. 5A is a flow chart depicting a method 502A of 3D scanning an object that may be moved or held by hand.

At block 504A, capture image(s) of scene under influence of projected phase images.

At block 506A, compute one or more 3D datasets from the 2D images captured at block 504A.

At block 508A, identify 3D data points and image pixels corresponding to object, as well as points and image pixels that are not consistent between the plurality of 3D datasets, for example those resulting from hand (if present) and environment.

At block 510A, remove 3D data points that were not consistent, for example those that represent the hand.

At block 512A, repeat for additional poses of object, hand and scanner until desired data coverage is achieved.

At block 514A, align and combine datasets (with hand data removed) to create complete 3D object dataset until complete at block 516A. Note that the steps in FIG. 5 may be performed in a different order, for example data corresponding to the hand may be identified in image pixels prior to decoding 3 FIG. D data. Also 3D data may be aligned prior to identification and removal of inconsistent data. Note that the scanning may occur while the user is continuously grasping the object and the creation of the complete 3D dataset without the hand can be completed without releasing the hand grasp of the object. Further, removal of the hand from the combined datasets can be free of user intervention. That means that the user may handle the object being scanned during the scanning process and the scanning result dataset will just represent the object and not the user's hand without the user having to do any manual editing of the 3D dataset or 3D file to remove unwanted hand data and without the user having to perform any extra steps in the scanning process.

In typical scanning processes, the user is either not able to handle objects during the scanning process which makes the scanning process slow and more importantly results in hard-to-scan areas such as concavities being missed or having little data collected, or if the user does handle the object during scanning, the user must manually edit the resulting 3D data afterward to remove portions of the data corresponding to the user's hand. This often results in inaccuracies in the data (if the manual data editing process is imperfect and some of the data from the hand remains in the dataset) and may result in physical parts being manufactured that have physical imperfections based on the imperfect data. This in turn can lead to improper fit and component or machine failures. Further, it is difficult or requires many steps and manual operations to gather, align and stitch together data about all sides of an object with typical 3D scanners. Typical 3D scanners typically do not allow objects to be repositioned during the scanning process; rather they require collection of multiple separate data sets which must be manually joined via a time consuming, error-prone process.

The process described in FIGS. 5 and 5A for removing the hand from 3D scanning data can solve the above technological problems, for example by automatically removing 3D data with precision that was not part of the object and by allowing an object being scanned to be repositioned by hand during the scanning process and automatically rotating and unifying data captured from multiple object orientations and removing any data that came from the hand. This can solve the technological problem of errors of physical shape, which can be minimized resulting in physical components manufactured based on the dataset with proper function and fewer failures, and this can be done with less time and greater efficiency than common with conventional scanning processes.

Figure 6:
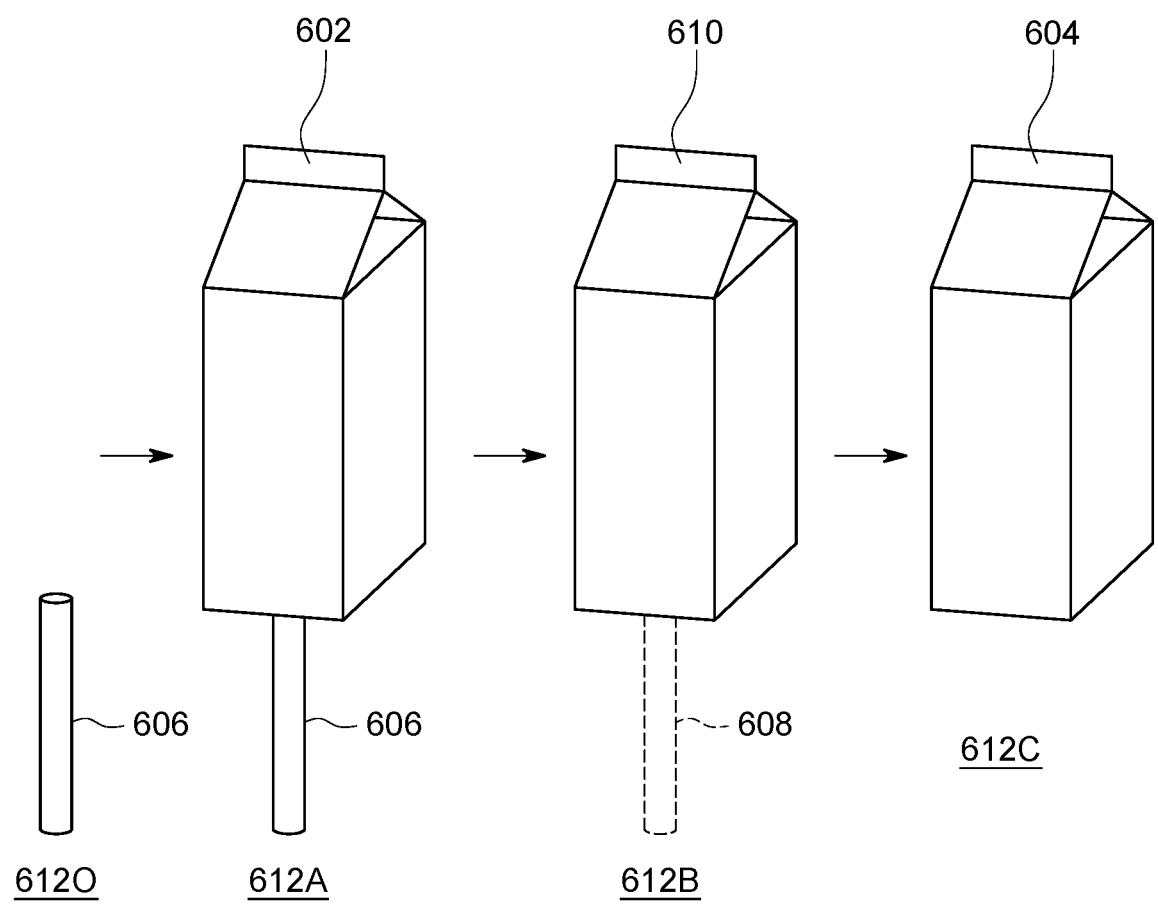
FIG. 6 shows a 3D scanning process in which a support is removed from the data.

FIG. 6 shows a 3D scanning process in which an object 602 is scanned to create a complete 3D digital representation 604 that represents the shape of object 602 without losing areas of data that might have been inaccessible if object 602 was scanned while sitting on a base such as a table. In a first step labeled 6120, a support object 606 is positioned in the scanning environment and 3D scan data and/or photos are captured of support 606. In a second step labeled 612A, object 602 is placed onto support 606 and is scanned to capture 3D data and potentially photo and/or video data. During step 612A, object 602 may be rotated as necessary to achieve complete scanning coverage of object 602. Intermediate data sets captured during step 612A may have data created from the shape of support 606. In a step labeled 612B, subsets of 3D data 608 are identified which correspond to support 606 and other portions of the data 610 are identified which correspond to object 602. Then in a step labeled 612C, the portions of the data which represented support 606 are removed and the remaining datasets are merged to yield the final unified data 604 representing the intended object 602.

The processes set forth in FIG. 6 advantageously allow for automatic identification and removal of data related to the support object and yields unified 3D data of only an object being scanned. This is a technological solution to the technological problem that typical 3D scanners experienced, in which typical 3D scanners often gather shape data of a support objected under an object being scanned and this data must be manually removed which is time-consuming.

Figure 7:
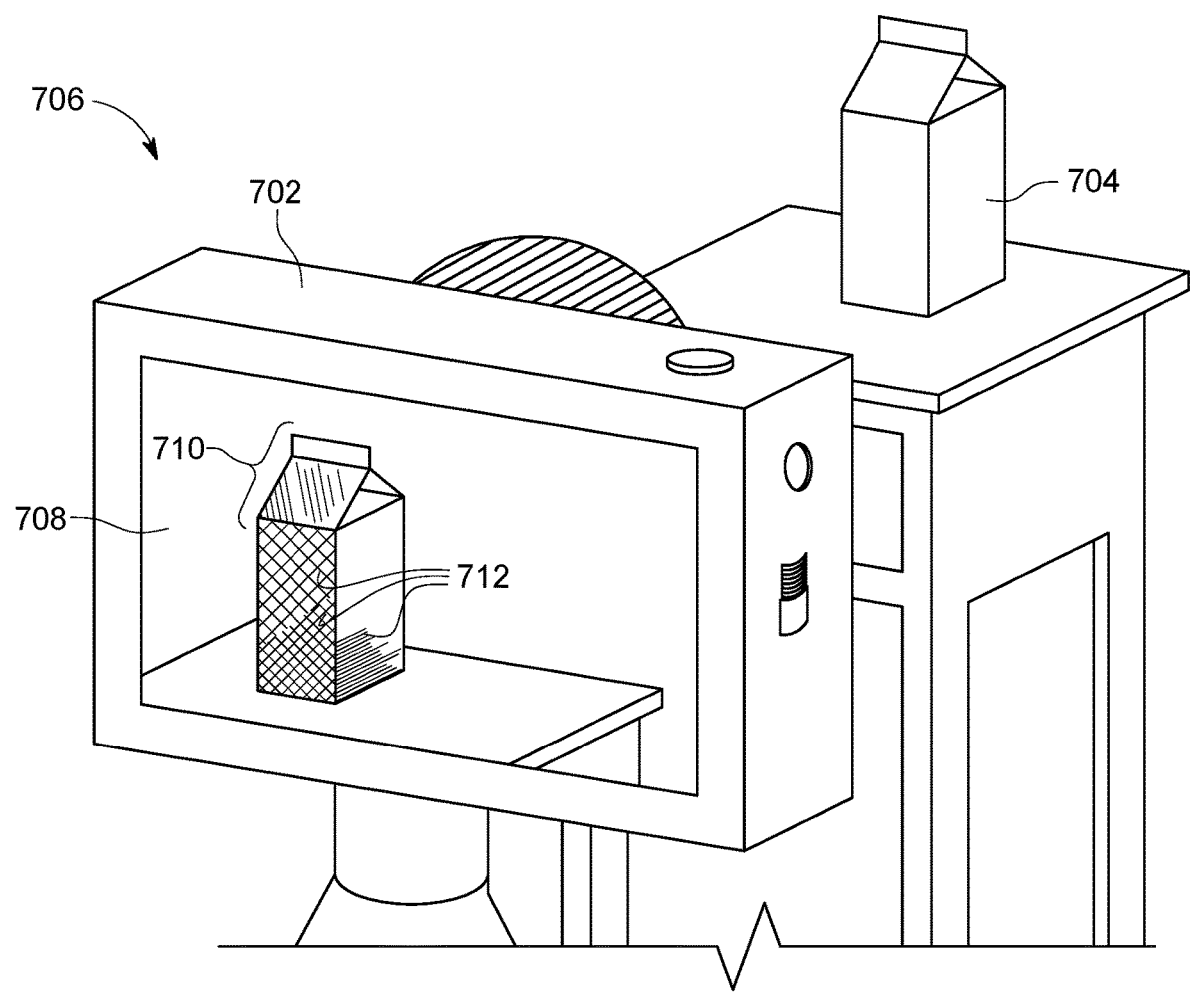
FIG. 7 shows a 3D scanning process with user feedback about data quality.

FIG. 7 shows a 3D scanning process in which a scanner 702 is used to scan an object 704 to create a 3D digital representation 706 of object 704. During the scanning process, 3D datasets may be acquired incrementally and aligned and merged. Data on convex areas of object 704 with optically favorable materials may be of high quality even from the first few datasets, for example it may have the desired density of points and the accuracy of the points may be optimal. However, in areas that are concave, recessed, or where materials or colors or lighting are less optimal for the scanning process, data may either not be acquired or data that is acquired may be of low quality (e.g. few data points per area (low density) and/or low accuracy). Scanner 702 may have a feedback screen 708, which may be used to display real-time visual feedback 710 to the user during the scanning process. Visual feedback 710 may include differentiated areas 712 representing different levels of quality of scan data as it is being acquired. Differentiated areas 712 may be displayed in different colors or textures (based e.g., on the density of shading/cross-hatching), and they may update dynamically to indicate changes in the status of the net data that has been acquired or is currently being acquired. Feedback 710 and areas 712 may allow the user to efficiently guide the scanning process to acquire more data and/or better quality data in areas where quality or quantity is poor and also to avoid re-scanning areas where data quality or quantity are already acceptable. This process may also help the user to achieve an optimally accurate result and optimal coverage in as little time as possible. This method may result in higher quality scan data in less time and higher quality manufactured parts with tighter tolerances, better shape fidelity, better manufacturing process efficiency (e.g. less re-work) and lower rejection rate when parts are manufactured according to 3D scan data.

Visual feedback, for example colors on a dynamic 3D model representing captured data or the on-going data capture process, could indicate density of data points, confidence in depth values, orthogonality of matrices used in depth calculations, whether depth data was captured at "best" angle to capture device (likely orthogonal—because data captured for skew surfaces will be lower quality).

Data density can be considered the number of data points per unit area. A minimum data density may be required to enable a desired global accuracy of capture of an object with a certain maximum curvature (curvature=1/local radius). Besides curvature, data density also relates to the frequency of features that can be captured. For example grains of 100 grit sandpaper (100 grains per square inch) could be detected with a data density with some minimum multiple of 100 data points per square inch. The minimum multiple for detection of grain features would typically be 4 (i.e. 400 points per square inch) because the linear data density would need to be double the linear density of the grains and this gets squared to get the area density. This is the minimum density required to detect a typical grain, but does not guarantee that its complete shape is represented, which would typically require a much higher data density.

In 3D scanning it is often desired to capture an object or a given feature with a certain minimum data density, which may be independent of the accuracy. For example, captured data of embossed words may become legible with a certain minimum data density, and this may be true without regard to the accuracy of the data (the data may be displaced any uniform amount and therefore have very low accuracy but still be legible).

Data density is necessary but not sufficient to enable global accuracy. Accuracy can be considered the inverse of the difference between a position representation in the data compared to the corresponding position on the actual object (e.g. "ground truth"). Accuracy and error are often incorrectly used interchangeably, but accuracy gets higher as error gets lower, so accuracy is the inverse of error. Any given data point may be perfectly accurate (without any requirement for data density), but data density is required for global accuracy between data points as explained below.

Data density implies an average linear spacing between data points (also often called resolution): If we have X data points per unit area, then the average linear density is square root of X data points per unit length and the average spacing between data points is 1/(average linear density); having a minimum spacing between points and therefore a minimum data density is important to capturing object details. Finer details by definition have higher curvature. The higher the curvature in a given area the lower the point spacing must be (and therefore the higher the data density must be) to achieve a required minimum absolute error when data points are connected to form a triangular mesh, which is a process known to those of ordinary skill in the art.

For many engineering use cases including small precision parts, it is useful to have a resolution of between 0.001 mm and 0.1 mm. For other use cases such as larger parts, architectural uses or consumer uses a resolution of 1 mm to 100 mm may be acceptable.

A characteristic of conventional 3D scanning approaches is that they collect data points with a planar image sensor. Data points are 3D (e.g. x,y,z values), but they are collected by locations on a planar sensor. The result is that when an area of an object or scene being captured is at an angle with respect to the sensor plane the collected data points are spread out. Where areas of a scanned object are at significant angles to the plane of the image sensor (e.g. greater than 45 degrees), the number of data points per area of the object surface can be significantly lower than the nominal data density in areas parallel to the sensor plane. Additionally, accuracy of data collected for areas of objects at significant angles to the plane of the image sensor is typically worse than data gathered for areas that are closer to parallel to the plane of the image sensor. Conventional 3D scanning techniques generally do not give the user real-time feedback about data density, or if they do give some feedback it is only with regard to whether data has been captured in an area and does not give more detailed real time information about the local density with respect to the surface area of the object being scanned. Conventional 3D scanning techniques generally do not give the user feedback (real-time or otherwise) about data accuracy.

The present systems and/or methods provide the user with real-time feedback about both the density of data as it is being captured and optionally data accuracy. Further, the feedback can represent the density of the data relative to the angle of object surface (rather than relative to a plane parallel to the sensor). Additionally, the feedback can represent the net data density resulting from the combination of multiple overlapping datasets collected during a single capture session. For example a scanning camera (which may be hand-held) may capture many data sets per second (for example, between 2 and 100; in one example a desired value may be 10) and these datasets may be aligned in real-time or near-real-time to provide a net data density based on the total number of data points collected in a given area of the surface of the object being scanned divided by that area. Note that each dataset may in general be collected from a different camera pose (pose means angle and position) and therefore at a different angle to the area of the object being scanned. The feedback provided to the user may represent a net data density reflecting the effect of combining data captured from different angles. The feedback can show when a desired data density (and/or data accuracy) has been reached or it may smoothly change to reflect any existing net data density or accuracy.

Accuracy of 3D scanning data points is affected by many factors including calibration errors, errors intrinsic to sensor and projector processes and in the case of phase-shift-profilometry, errors related to the behavior of light in the scene where the object is being scanned. During the scanning process the user may have control over some factors that affect the accuracy of the data collected—especially factors related to light in the scene. For example accuracy of data collected may be higher when the scanner is closer to the object and lower when it is farther away. Less obvious is that the data may be more accurate when the sensor plane (or some other plane defined by the projector and sensor geometry) is close to parallel to the surface of the object being scanned. Or if the object is shiny, accuracy may be very poor where the sensor "sees" a specular highlight and conversely accuracy may be dramatically higher for certain, possibly narrow, bands of angles between scanner and object. Ambient light sources may also reflect off the scene and/or object to affect data quality for some scanner or object positions. The scanner may be able to detect absolute or relative accuracy of data being received. For example if raw sensor data is near or over a sensor saturation threshold (maximum reading), the scanner or scanning software may decide that there is a high probability that the accuracy of the data may be poor. Another example is if the data being received indicates that there is a high relative angle between the scanner and the object, the system may decide that the data accuracy may be low (this can be true whether or not it can determine the specific local accuracy). The user may have real-time control over the scanner angle and position (especially for a hand-held scanner). The present systems and/or methods can provide feedback to the user about the data accuracy that may allow the user to dynamically change the scanner position, angle, or scene ambient lighting or scanner projector brightness and may therefore be able to achieve higher net data accuracy than if she or he did not have this feedback.

The visual feedback system set forth in FIG. 7 advantageously provides real-time feedback about data quality and/or data density so a scanner user may easily and confidently achieve the desired level of data quality and density in important areas and may use lower data quality or data density in areas that are not as important. This is a technological solution to the technological problems of typical scanning systems, which have difficulty capturing data in hard-to-scan areas such as concavities and they do not provide feedback about data accuracy or data density. A consequence is that important features are not always captured with high enough accuracy or data density for the intended application. For example parts manufactured based on typical 3D scan data may not meet required tolerances and may not fit correctly as a result.

Figure 8A:
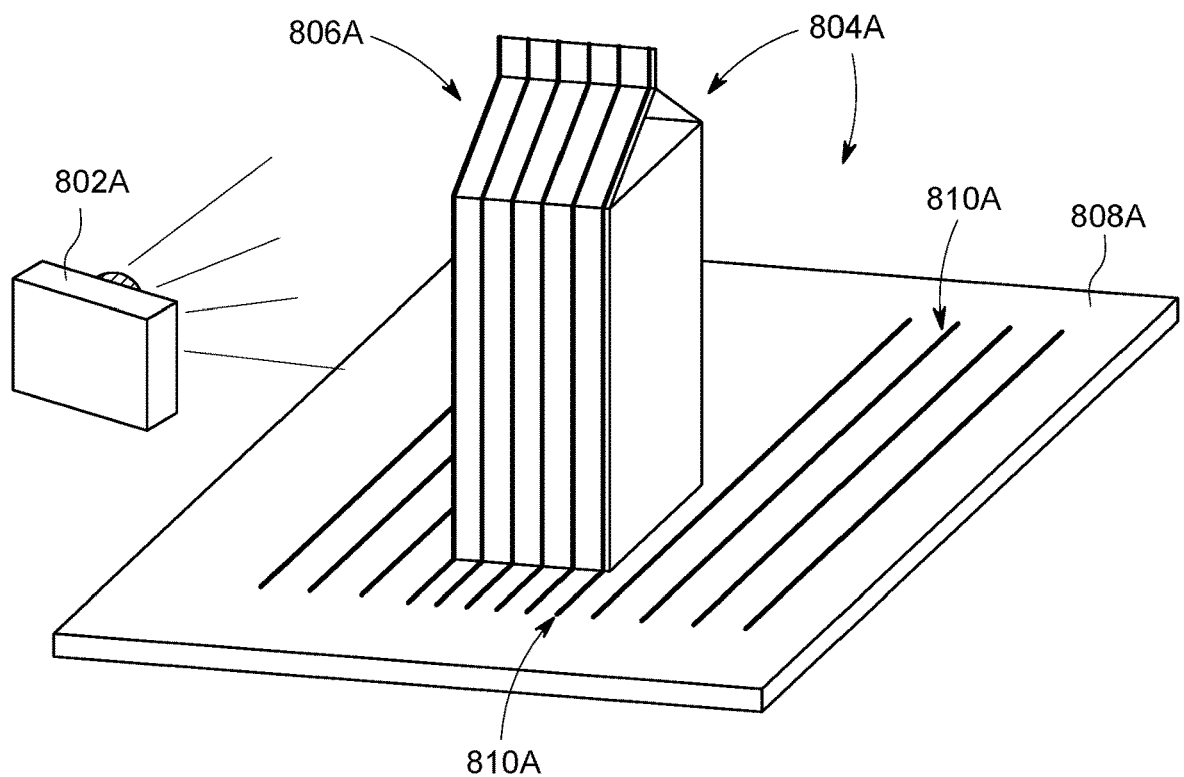
FIG. 8A shows a 3D scanning process using structured light illumination patterns.
Figure 8B:
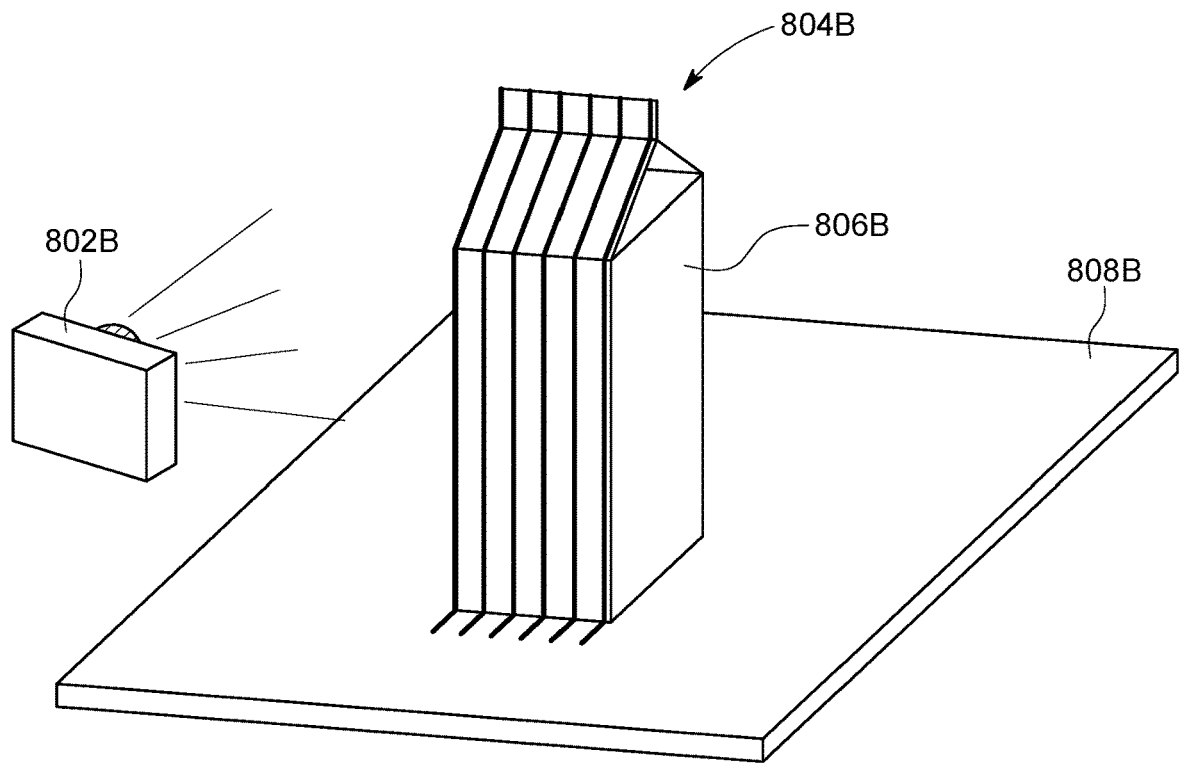
FIG. 8B shows a 3D scanning process using modified structured light illumination patterns.

FIGS. 8A and 8B depict structured light scanning processes.

FIG. 8A shows a scanning process in which a scanner 802a creates a structured light illumination pattern 804a using a projector (e.g., projector 204) which illuminates an object to be scanned 806a and also illuminates some parts of the rest of a scene 808a with overflow illumination 810a. Scanner 802a captures images of object 806a and scene 808a in order to reconstruct a 3D model (not shown). Overflow illumination 810a results in some of scene 808a being reconstructed in the 3D model.

FIG. 8B shows a scanning process in which a scanner 802b creates a structured light illumination pattern 804b using a projector (e.g., projector 204) which illuminates an object to be scanned 806b. In contrast to the scanning process of FIG. 8A, illumination pattern 804b may be actively cropped to a smaller area so that it primarily illuminates object 806b or a portion thereof and may not illuminate a scene 808b. This may enable 3D scan data to be acquired that represents object 806b and may not contain artifacts of scene 808b. Cropping illumination pattern 804b may be accomplished by acquiring one or more 3D datasets, searching for a subset of the data that is near (e.g. within +/−25% of the middle of the scanning range, then further down selecting from that data by removing any large planar areas of data toward the bottom of the data (according to a gravity vector) which have an upward facing normal vector; Then an image mask may be created which matches the shape of the remaining 3D data projected onto a plane parallel to the light source (e.g. projector). Finally, light patterns to be projected may be clipped by performing a pixel-wise boolean union operation between each image pattern and the image mask (an operation common in ordinary image manipulation known to those skilled in the art). It may be desirable to expand the image mask slightly and/or periodically update the shape of the image mask so that projected images are correctly cropped even after relative motion between the scanning device and the object being scanned. An alternate method of performing cropping is to use computer vision (CV) techniques to identify the most prominent foreground object in 2D captured images and use the boundary of the most prominent object to create a clipping mask. Scanner 802*b* may take digital photos (e.g., capture still or moving images) or video or other preliminary data of object 806 and perform an analysis step such as using computer vision (CV) algorithms to identify the boundary of object 806*b*, and then use the results of that analysis to actively generate structured light illumination patterns such as 804 so that they illuminate object 806*b* and not other objects or scene 808*b*. It may be possible to use other types of sensors and data collection in combination with or instead of photos, including but not limited to sonar, blue light, IR light, time-of-flight, lidar, depth-of-focus and video to infer the boundary of the object to be scanned.

Figure 8C:
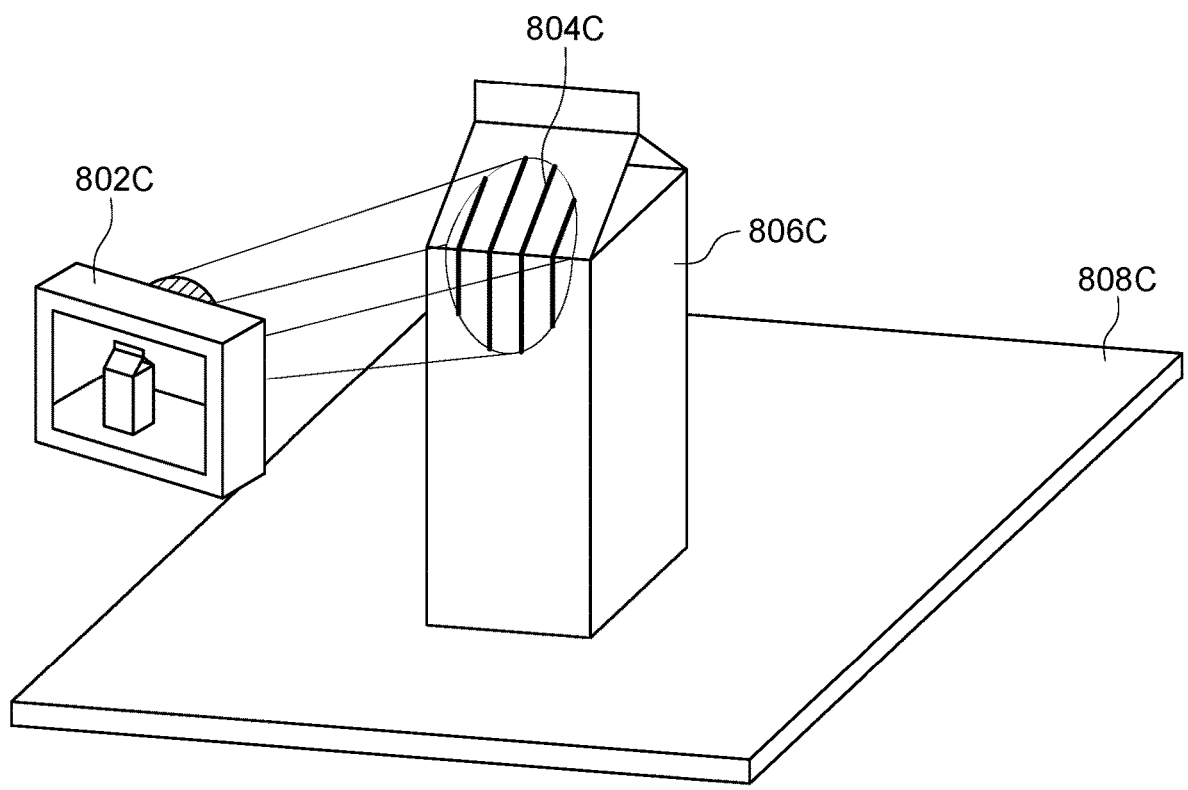
FIG. 8C shows a 3D scanning process using modified structured light illumination patterns.

FIG. 8C shows a scanning process in which a scanner 802*c* creates a structured light illumination pattern 804*c* which illuminates an object to be scanned 806*c*. In contrast to the scanning process of FIG. 8A, illumination pattern 804*c* is generated in a more limited area which avoids capturing excessive 3D data potentially including avoiding capturing unwanted data from a surrounding scene 808*c*. Illumination pattern 804*c* may have a fixed border shape and size (e.g. round, oval or square or some other regular or irregular geometric shape) or it may varied dynamically and the border shape and size of illumination pattern 804*c* may be generated on a per-frame basis (potentially generated dynamically for each captured image used to reconstruct 3D data in a timespan potentially less than 100 milliseconds between captured images). The shape of illumination pattern 804*c* may be generated based on prior 3D scan data already captured or it may be generated based on photo or video data captured simultaneously with the scanning process or it may be generated based on other sensor data or it may be static, or any combination thereof.

FIGS. 9A-9E shows several views of one possible configuration of a handheld 3D scanner 902. Scanner 902 has a scanning module 904 which includes a camera 906 and an active illumination source 908. Illumination source 908 may be a projector, a modulated laser, an LED light source (e.g. light emitting module) or other actively controlled source of light. Scanner 902 may also include a screen portion 910 which may have a screen 912. Screen 912 may be any form of visual user feedback device including, LED, OLED, LCD, projector, or other visual feedback devices. Scanner 902 may also include a connection 914 (e.g. connection member) which may movably (e.g., rotatably) join scanning module 904 and screen portion 910 so that scanning module 904 may be moved or rotated with respect to screen portion 910. The connection 914 allows for relative movement of the scanning module with respect to the screen 912. In one example, the rotation can be up to approximately 270 degrees, e.g., 270 degrees +/−5 degrees. Scanning module 904 may hold camera 906 and illumination source 908 in rigid alignment to create a primary scanning direction 916. Screen 912 may have a primary viewing direction 918. Connection 914 may allow the relative angle between primary scanning direction 916 and primary viewing direction 918 to be changed by the user.

The 3D capture system with display screen and 3D data capture sensor are rotatable with respect to one another. Rotation between the modules can be implemented in a variety of ways, such as a pivot, which should be clear to those of skill. The user may grasp the display screen and rotate the capture sensor and vice versa, making each component separately rotatable. This allows for the capture data in one direction while viewing the data from a different direction—for example capturing an architectural detail that is above a user's head with the capture sensor pointed horizontally or slightly downward to get the top of the item and having the screen tilted down so the screen can be viewed by the user without tilting his or her head (instead of having to climb a ladder to see the screen that would be facing upward if it was fixed to the capture sensor orientation). This also allows the user to comfortably capture image data in hard to reach areas.

Figure 10:
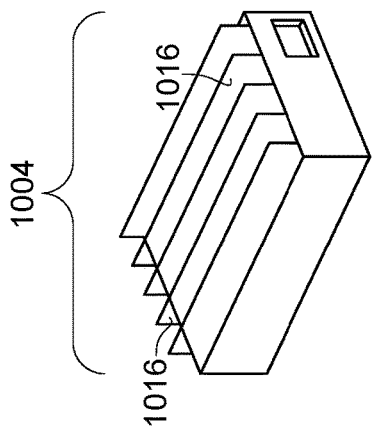
FIG. 10-10M shows several views and options for an embodiment of a 3D scanning device.
Figure 10E:
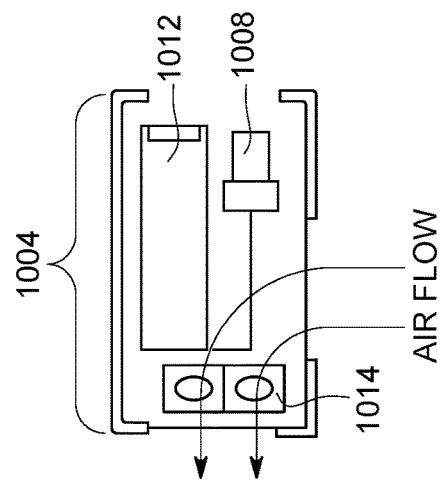
Figure 10D:
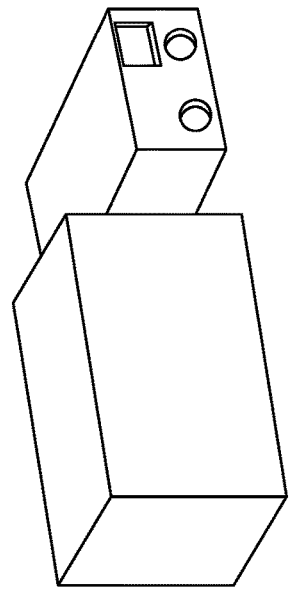
Figure 10F:
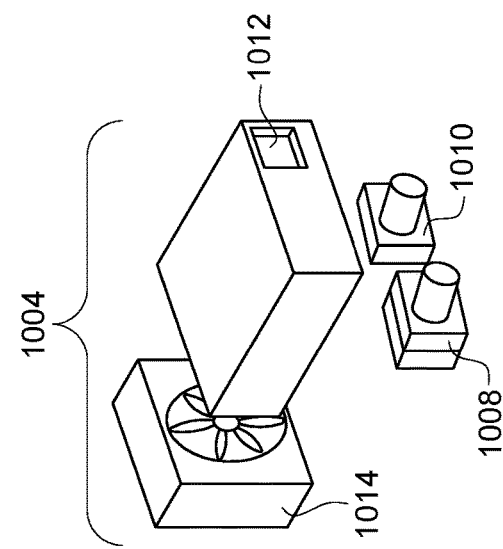
Figure 10A:
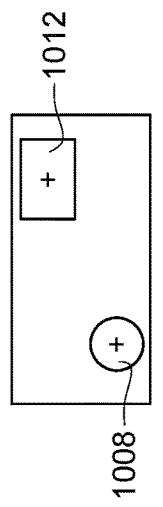
Figure 10B:
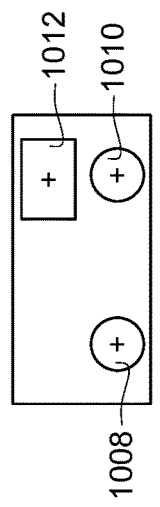
Figure 10C:
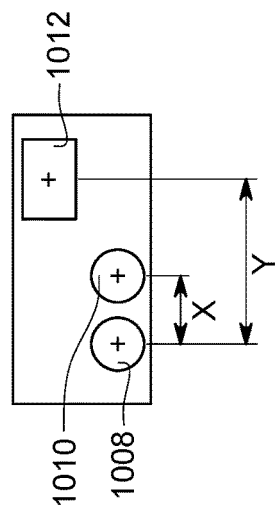
Figure 10G:
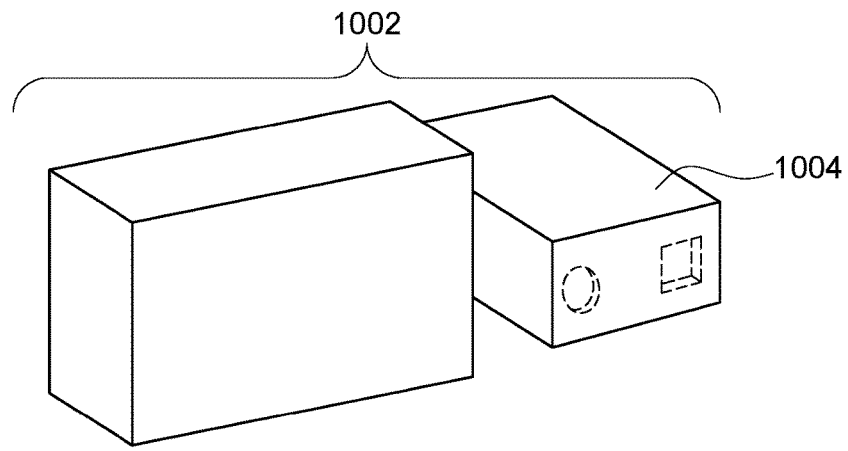
Figure 10H:
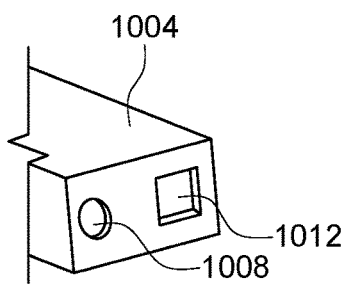
Figure 10J:
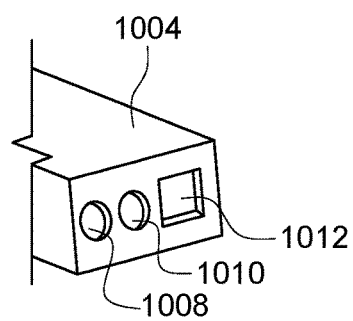
Figure 10L:
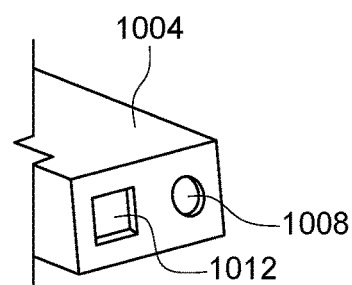
Figure 10I:
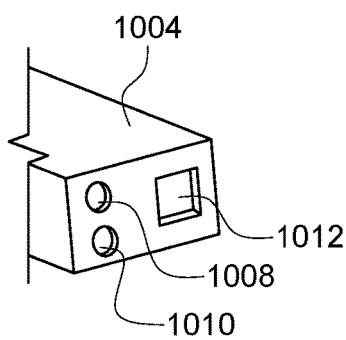
Figure 10K:
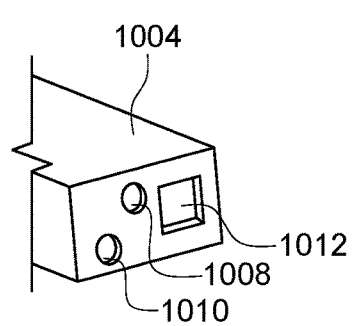
Figure 10M:
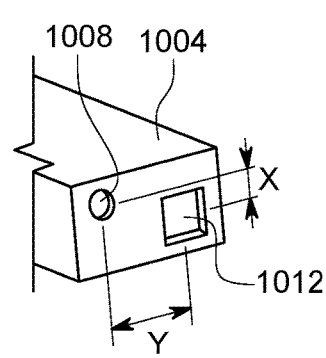

FIGS. 10-10M show several views and options for an embodiment of a 3D scanning device 1002. Scanning device 1002 may have a scanner module 1004 which is rotatable with respect to a base portion 1006 via a rotatable coupling (not shown). Scanner module 1004 may include a first camera 1008, an optional second camera 1010 and an illumination source 1012. Scanner module 1004 may also include a cooling fan 1014 and cooling fins 1016.

FIG. 10A shows one possible configuration of scanner module 1004, first camera 1008 and illumination source 1012.

FIG. 10B shows another possible configuration of scanner module 1004, with first camera 1008 optional second camera 1010, and illumination source 1012.

FIG. 10C shows another possible configuration of scanner module 1004, with first camera 1008 optional second camera 1010, and illumination source 1012.

FIG. 10D shows one possible configuration of internal components of scanner module 1004, including first camera 1008, optional second camera 1010, illumination source 1012 and cooling fan 1014.

FIG. 10E shows another possible configuration of scanner module 1004 including optional cooling fins 1016.

FIG. 10F shows possible airflow through scanner module 1004 and arrangement of illumination source 1012, camera 1008 and cooling fan 1014.

FIGS. 10G, 10H, 10I, 10J, 10K, 10L and 10M show more possible configurations of scanning device 1002 and scanner module 1004 including camera 1008, optional second camera 1010, and illumination source 1012.

Figure 11A:
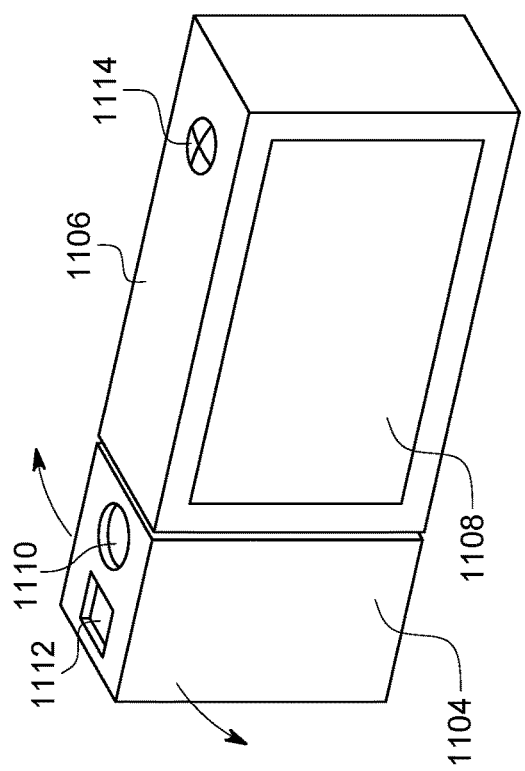
FIG. 11A-11C shows several views and options for an embodiment of a 3D scanning device.
Figure 11C:
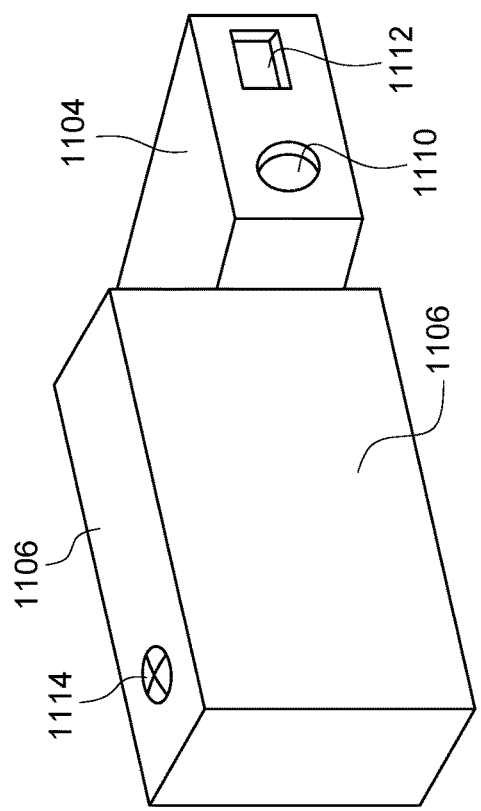
Figure 11B:
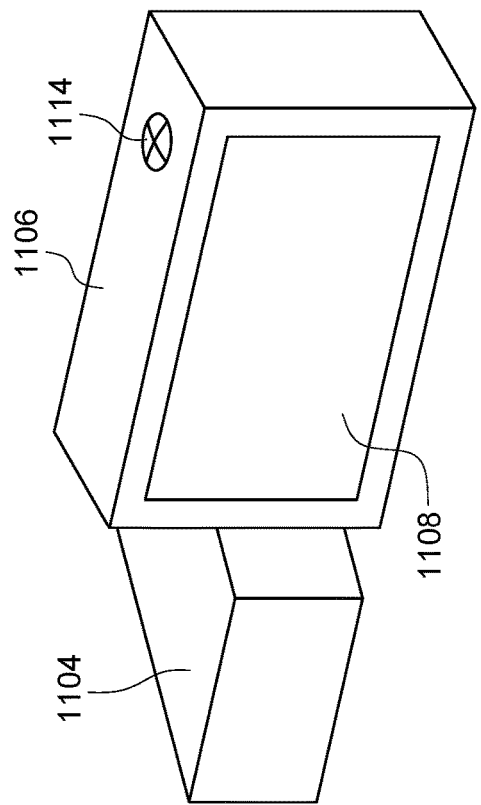

FIGS. 11A, 11B and 11C show different views and rotational configurations of a scanning device 1102. Scanning device 1102 may include a scanner module 1104, a base portion 1106 a user feedback screen 1108, a camera 1110, an illumination device 1112 and an interaction button 1114. Button 1114 may be a shutter button, a capture trigger, a power button or some other function. Scanner module 1104 may be rotatably connected to base portion 1106 via a rotational coupling (not shown) which may allow scanner module 1104 to be rotated with respect to base portion 1106 and/or screen 1108.

FIGS. 12A, 12B, 12C, 12D, and 12E show different views and rotational configurations of a scanning device 1202. Scanning device 1202 is similar to device 1102 of FIG. 11, but has slightly different geometry which may in some instances better accommodate placement of internal components and/or user ergonomics. In particular, a scanner module 1204 may have an offset portion 1206 to make more room for a camera 1208 and/or an illumination source 1210 and/or a screen 1212. FIGS. 12c, 12d and 12e show scanning device 1202 with scanner module 1204 in different rotational positions.

The systems as set forth in FIGS. 9-12 advantageously provide real-time feedback about the scanning process, but when scanning hard-to-reach areas such as overhead or underneath, it can be difficult for a user to see a scanner's feedback screen while keeping the scanner sensor pointed in the correct direction. This is a technological solution to the technological problem of typical systems where scanning hard-to-reach areas such as overhead or underneath, it can be difficult for a user to see a scanner's feedback screen while keeping the scanner sensor pointed in the correct direction.

Figure 13:
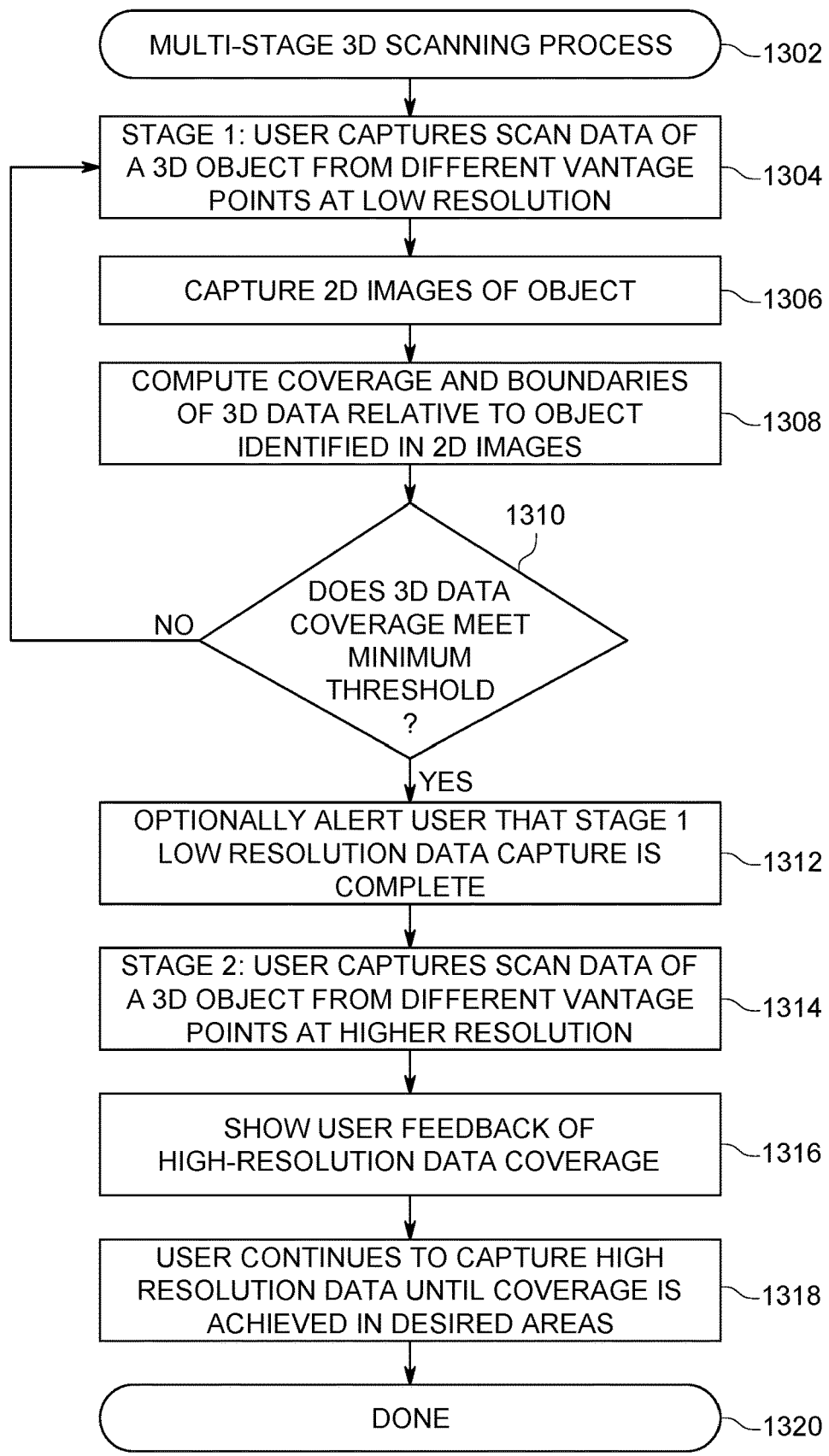
FIG. 13 is a flow chart depicting a multi-stage scanning process.

FIG. 13 is a flow chart depicting a method 1302 of multi-stage 3D scanning including multiple, possibly sequential capture modes according to one or more aspects of the disclosure.

At block 1304, in a first scan mode, a user captures scan data of a 3D object from different vantage points at low resolution. In this example, this can be a broad, fast, low data-density (e.g. low resolution) capture of the general shape of an object to be captured.

At block 1306, capture 2D images of object. In one example, the method can be accomplished without capturing 2D images.

At block 1308, compute coverage and boundaries of 3D data relative to object identified in 2D images. Alternately, the low-resolution 3D data may be tested directly for coverage, for example by using metrics of closure or size of holes (e.g. missing data) relative to total size (e.g. surface area) of captured 3D data.

At decision block 1310, it is determined whether the 3D data coverage meets a minimum threshold.

If yes at block 1310, then proceed to block 1312 to optionally alert user that stage 1 low resolution data capture is complete.

At block 1314, in a second mode, a user captures scan data of a 3D object from different vantage points at higher resolution. This second mode can be initiated to capture more detail where needed. In another example, the second mode can be initiated to capture particular features of interest, such as an optional mode to capture holes or concavities; an optional mode to capture bosses/protrusions; an optional mode to capture dark objects (or dark areas of mixed-darkness objects); an optional mode to capture shiny objects (or shiny areas of mixed-reflectivity/specularity objects); an optional mode to capture light objects (or light areas of mixed-lightness objects); an optional mode to capture transparent objects (or transparent areas of mixed-transparency objects).

At block 1316, show user feedback of high-resolution data coverage.

At block 1318, user continues to capture high resolution data until coverage is achieved at block 1320 in desired areas.

The scanning modes described above with respect to FIG. 13 (or any other modes described in the present application) may be user-driven (e.g., modes can be switched with user input) or may include automatic switching (e.g., free of user input) of scanning modes. One example of automatic switching of scanning modes is that a scanner could automatically switch out of broad low-density mode to a more detailed scanning mode once sufficient low-resolution coverage of an object to be scanned is achieved.

The process set forth in FIG. 13 advantageously provides a second higher-resolution scanning mode to achieve a desired 3D data coverage of an object. In one example, that may be done automatically (e.g., free of user input). This is a technological solution to the technological problems of typical scanning systems, which have difficulty capturing data in hard-to-scan areas such as concavities and they do not provide feedback about data accuracy or data density. A consequence is that important features are not always captured with high enough accuracy or data density for the intended application. For example parts manufactured based on typical 3D scan data may not meet required tolerances and may not fit correctly as a result.

Figure 14:
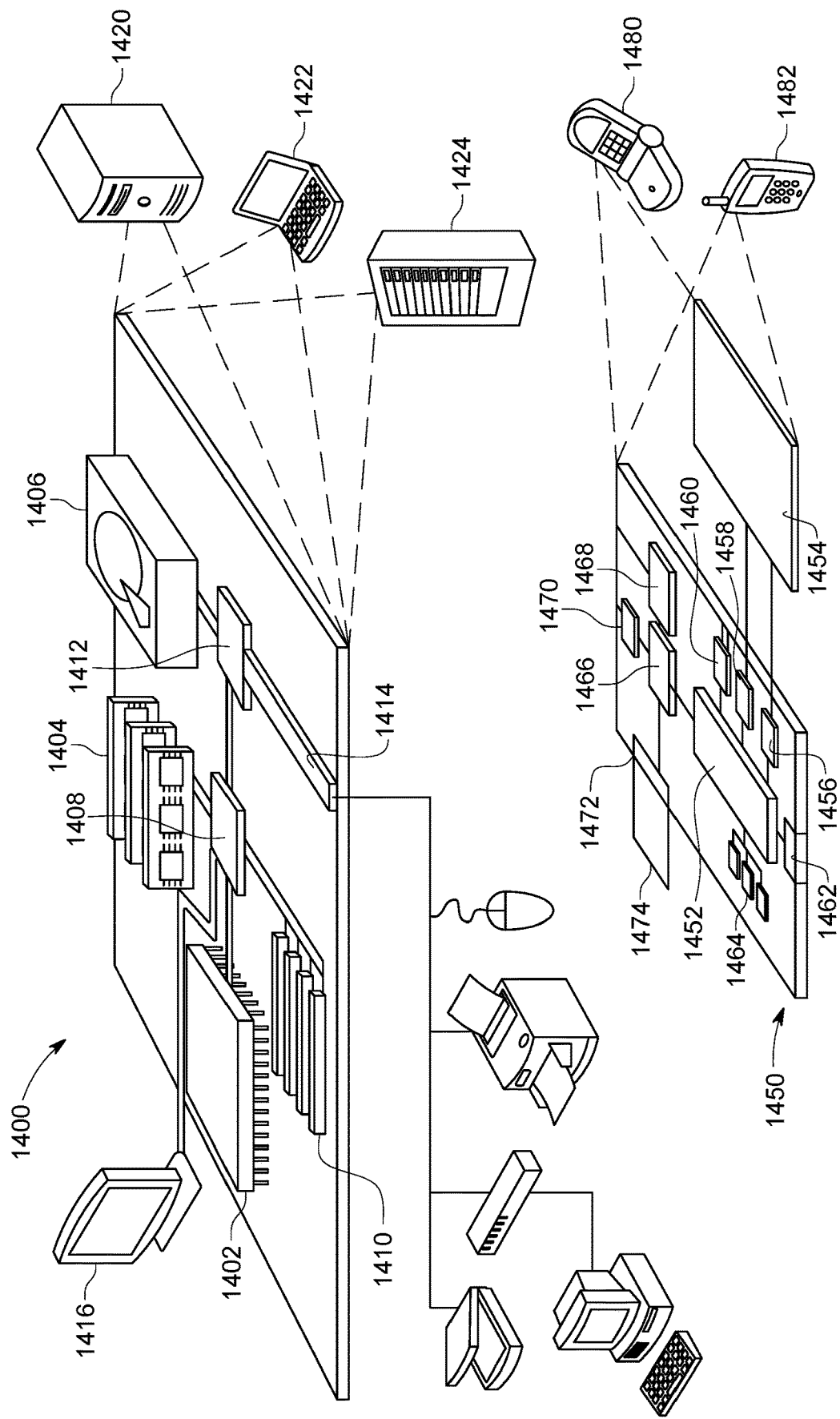
FIG. 14 is a block diagram of computing devices that may be used to implement the systems and methods described herein.

FIG. 14 is a block diagram of computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. Additionally, computing device 1400 or 1450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high-speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high speed expansion ports 1410, which may accept various expansion cards (not shown). In the implementation, low speed controller 1412 is coupled to storage device 1406 and low speed expansion port 1414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1414, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. Additionally, the processor may be implemented using any of a number of architectures. For example, the processor 1402 may be a FPGA, ASIC, CISC (Complex Instruction Set Computers) processor, a RISC (Reduced Instruction Set Computer) processor, or a MISC (Minimal Instruction Set Computer) processor. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT (Thin-Film-Transistor Liquid Crystal Display) display or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452 that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "non-transitory machine-readable medium" "non-transitory computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. As used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

The invention claimed is:

1. A method of scanning an object in an environment, comprising:
   projecting light on the object;
   capturing at least a first image of the object with a first sensor;
   capturing at least a second image of the environment with a second sensor;
   generating metadata from the second image, the metadata comprising an accuracy per scan data point with respect to the first image; and
   associating the metadata with the first image.

2. The method of claim 1, further comprising storing the first image and the associated metadata in a searchable database.

3. The method of claim 1, wherein the accuracy per scan data point with respect to the first image comprises an accuracy per 3D scan data point with respect to the first image.

4. A method of scanning an object in an environment, comprising:
   projecting light on the object;
   capturing at least a first image of the object with a first sensor;
   capturing at least a second image of the environment with a second sensor;

generating metadata from the second image, the metadata comprising a maximum estimated error in scan data with respect to the first image; and associating the metadata with the first image.

5. The method of claim 4, further comprising storing the first image and the associated metadata in a searchable database.

6. A system for scanning an object in an environment, comprising:

a light source configured to project light on the object;

a first sensor configured to capture at least a first image of the object;

a second sensor configured to capture at least a second image of the environment; and a processor configured to generate metadata from the second image, the metadata comprising an accuracy per scan data point with respect to the first image, and associate the metadata with the first image.

7. The system of claim 6, wherein the processor is further configured to store the first image and the associated metadata in a searchable database.

8. The system of claim 6, wherein the accuracy per scan data point with respect to the first image comprises an accuracy per 3D scan data point with respect to the first image.

9. A system for scanning an object in an environment, comprising:

a light source configured to project light on the object;

a first sensor configured to capture at least a first image of the object;

a second sensor configured to capture at least a second image of the environment; and a processor configured to generate metadata from the second image, the metadata comprising a maximum estimated error in scan data with respect to the first image, and associate the metadata with the first image.

10. The system of claim 9, wherein the processor is further configured to store the first image and the associated metadata in a searchable database.

* * * * *